(12) United States Patent
Goldenberg et al.

(10) Patent No.: US 7,493,976 B2
(45) Date of Patent: Feb. 24, 2009

(54) VARIABLE CONFIGURATION ARTICULATED TRACKED VEHICLE

(75) Inventors: Andrew A. Goldenberg, Toronto (CA); Jun Lin, Toronto (CA)

(73) Assignee: Engineering Services, INc., Toronto, ON (CA)

( * ) Notice: Subject to any disclaimer, the term of this patent is extended or adjusted under 35 U.S.C. 154(b) by 517 days.

(21) Appl. No.: 11/196,486

(22) Filed: Aug. 4, 2005

(65) Prior Publication Data
US 2007/0029117 A1    Feb. 8, 2007

(51) Int. Cl.
*B62D 55/00* (2006.01)
(52) U.S. Cl. .......................................... 180/9.1; 180/9.5
(58) Field of Classification Search .................. 180/9.1, 180/9.32, 9.5, 9.48, 9.54, 9.58; 305/120, 305/132, 131, 135
See application file for complete search history.

(56) References Cited

U.S. PATENT DOCUMENTS

| | | | |
|---|---|---|---|
| 4,483,407 A | 11/1984 | Iwamoto et al. | |
| 4,932,831 A | 6/1990 | White et al. | |
| 5,022,812 A | 6/1991 | Coughlan et al. | |
| 5,884,718 A * | 3/1999 | Yamashiro et al. | 180/9.32 |
| 6,263,989 B1 | 7/2001 | Won | |
| 6,431,296 B1 | 8/2002 | Won | |
| 6,668,951 B2 | 12/2003 | Won | |

OTHER PUBLICATIONS 3 pages website information "Inuktun" VGTV miniature inspection system, Inuktun Services Ltd. Nanaimo, BC, Canada Mar. 17, 2005.
"Mechanical Design of Variable Configuration Tracked Vehicle" Taro Iwamoto and Hiroshi Yamamoto, Journal of Mechanical Design, vol. 112/pp. 289-294 Sep. 1990.

* cited by examiner

*Primary Examiner*—Paul N Dickson
*Assistant Examiner*—Marc A Scharich
(74) *Attorney, Agent, or Firm*—Nancy E. Hill; Hill & Schumacher

(57) ABSTRACT

A variable configuration articulated tracked vehicle comprises a chassis, a pair of right and left drive pulleys, a right and left planetary wheel, a right and left track, a right and left arm mechanism, and a right and left drive motor. The drive pulleys are rotatably attached to the chassis and each pair of drive pulleys is in the same plane. The planetary wheels are movable relative to the chassis such that each planetary wheel is in the same plane as its respective drive pulleys. The tracks extend around the pair of drive pulleys and the planetary wheel on the respective sides. The arm mechanisms connect the respective planetary wheel to the chassis. Each arm mechanism is rotatably attached to the chassis with a cam. The cam defines a motion path of one end of the arm whereby the motion of the planetary wheel provides a path for the planetary wheel such that the track path defined by the respective drive pulleys and the planetary wheel is a constant track length. The motors are each operably connected to the respective pair of drive pulleys for driving the track.

31 Claims, 23 Drawing Sheets

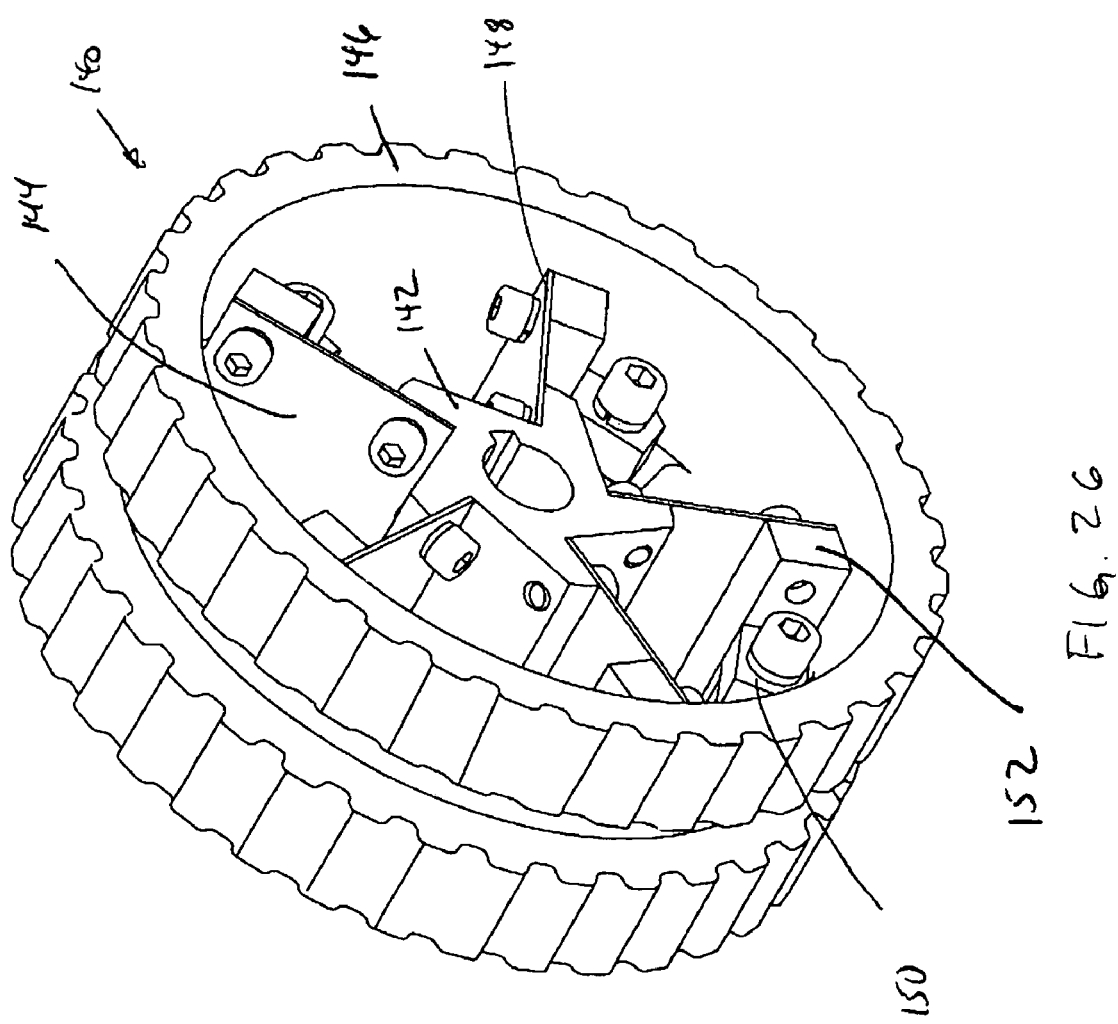

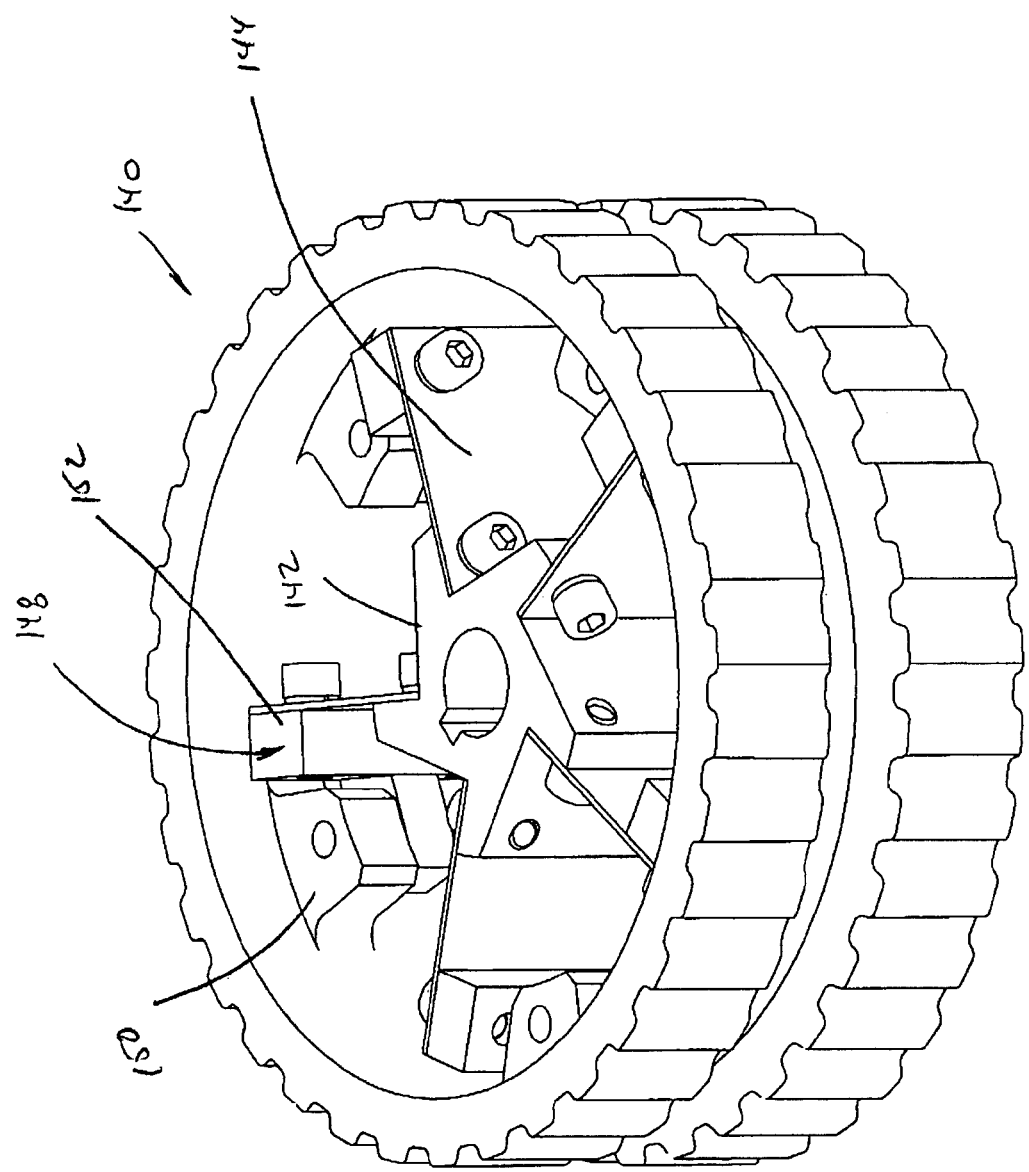

VARIABLE CONFIGURATION ARTICULATED TRACKED VEHICLE

FIELD OF THE INVENTION

This invention relates to tracked vehicles and in particular an articulated tracked vehicle having multiple configurations.

BACKGROUND OF THE INVENTION

Tracked vehicles are well known. They are generally used where the terrain is rough and unpredictable. Tracked vehicles are useful under user control, as well as for partially and fully autonomous mobile robots. One of the challenges with mobile robots is to provide a robot that can ascend and descend stairs, slopes, cross ditches, surmount certain obstacles, and generally operate over rough terrain whether moving forward or backward, turning on spot, etc.

One such mobile robot was suggested in U.S. Pat. No. 4,483,407 which shows an articulated track vehicle. This mobile robot includes an auxiliary arm supporting a planetary wheel on either side of the platform. The arms could operate on either side of the track: between the main body and the track, or on the other side of the track on the exterior of the mobile robot perimeter defined by the tracks. Each auxiliary arm is connected to the mobile robot platform with first and second arm linkages. The first arm is pivotally attached to the platform, the second arm is pivotally attached to the distal end of the first arm, and the planetary wheel is attached to the distal end of the second arm. The auxiliary arm is controlled such that the planetary wheel is exerting a tension onto the track. This auxiliary arm is pivoting in a plane parallel to the track longitudinal plane defined as cutting through the two sides of the belt: the upper and lower and perpendicular to the belt width. The arm plane depending on arm location is either located between the platform and track, or on the outside of the track. In the former the arm is actuated using a spring-slide-bar mechanism, and in the latter the arm is actuated using a gear-sprocket-mechanism. This vehicle has a number of disadvantages. Specifically, in the implementation using a spring-slide-bar mechanism it is impossible to ensure continuous tensioning of the track during the motion of the auxiliary wheel. This is the result of the arm mechanism design, which can not ensure an optimal path (perfect ellipse) of the planetary wheel. In addition, the location of the arm does not allow a full rotation of the arm because of interference with the platform pulleys axels. This reduces the effectiveness of the articulated track whose main purpose is to support motion on rough terrain, stairs, etc. In the implementation using a gear-sprocket mechanism there are no springs, therefore continuous tensioning of the track is impossible as the track may undergo variations in length due to operating conditions or stresses in directions that are not compensated actively by the track and arm mechanisms. Furthermore, this transmission mechanism is complicated as it involves six gears, 2 sprockets, and 1 chain, thus raising the cost of manufacturing and lowering the reliability.

Another such robot is INUKTUN VGTV. This mobile robot is small and light. It has an articulated track mechanism. The mechanism has an arm and a planetary wheel, both attached to the chassis on each side. It has a camera mounted on a platform attached to a common member connecting the two planetary wheels. The articulated tracks are used to raise the camera for surveillance and inspection. The articulated track mechanism has six moving members activated by one motor. This vehicle has a number of disadvantages. Specifically, it has limited variation of the track configuration in one direction only. It has very limited capability to operate on rough terrain. It cannot climb stairs because R is impossible to ensure tensioning of the track based on the articulated track mechanism. The mechanism does not ensure an optimal trajectory (perfect ellipse) of the planetary wheel, as there is no fixed focus of the ellipse. Further, the six-member planetary wheel mechanism is costly to manufacture and install.

Another such robot is shown in U.S. Pat. No. 6,668,951 which discloses a robot which includes a main section and a forward section. The forward section includes an elongate arm (flipper) that is pivotally attached to the front of the main section. The elongate arm has a length that is shorter than half of the main section. This vehicle has some disadvantages. Specifically the location of the centre of gravity cannot be changed adequately during the execution of a task to ensure the stability of the robot. The control of the location of center of gravity is very limited, with potential consequences such as instability on ascent or descent of steep (45 deg) stairs. Also, the vehicle can effectively move over obstacles only with the front end where the elongate arm is connected. Further, this vehicle's capability to cross wider ditches is somewhat limited relative to the platform length.

Accordingly it would be advantageous to provide a tracked vehicle that can overcome all of the disadvantages of the prior art as mentioned above, which are: (i) non-continuous tensioning of the track; and (ii) narrow variation of the location of the center of mass. The mobile robot would be adaptable to different terrains and would be suitable for traveling over a variety of surfaces and obstacles, including stairways and ditches. It would move in either direction with similar capability. It would flip over and perform as well in either orientation. Further it would be advantageous to provide a user-controlled active terrain adaptability of the vehicle with a variable (articulated) track configuration that can be regulated to suit real-time surface conditions. Also, it would be advantageous to make possible scaling up and down the basic design for smaller and larger mobile robots thus increasing the capability to perform a wider variety of tasks. Also, it would be advantageous to provide a vehicle that could withstand impact due to free fall from a height of approximately 2 m. Still further it would be advantageous to provide such a vehicle in a cost effective manner.

SUMMARY OF THE INVENTION

The present invention is directed to a variable configuration articulated tracked vehicle which comprises a chassis, a pair of right and left drive pulleys, a right and left planetary wheel, a right and left track belt, a right and left skid, and a drive means for the right and left track belt. The right and left drive pulleys are rotatably attached to the right and left side of the chassis respectively and each pair of drive pulleys is in the same plane. The right and left track each extend around the pair of drive pulleys and the planetary wheel on the respective sides. The right and left planetary wheel arms connect the respective planetary wheel to the chassis. Each arm is rotatably attached to the chassis with a cam. The cam defines a motion path of one end of the arm whereby the motion of the planetary wheel provides an elliptic path, Preferably the right and left planetary wheels are movable relative to the chassis such that each planetary wheel is in the same plane as its respective drive pulleys. The track belt is maintained at constant tension regardless of the track configuration. Preferably, the pulley and skids have compliance to impact from free fall.

Preferably the chassis contains a right and left drive motor, a right and left chain, a planetary wheel arm motor, electronic drivers for the motors, devices for wireless and cable (tether) communication, wide angle cameras, standard sensors (inclinometer, compass, GPS, battery indicator, and temperature meter), sockets for connecting various types of computer communication and mission payloads, batteries for power (mounted outside for ease of replacement and charging), and standard sensors. The motors have breaks and encoders.

There are a number of features of the present invention which are advantageous over the prior art. Specifically, the tensioning mechanism is an improvement over the prior art. As well, the present invention provides a wider range of control over the center of gravity by changing the position of the planetary wheel, as well as impact compliance to free fall. The mechanisms of providing the tensioning mechanism and variation of center of gravity location are simple, easy to maintain, manufacture, and assembly. The mobile robot of the present invention may also include other auxiliary items such as: multi-jointed arm, PTZ camera, automatic communication cable winding, small disrupter weapons, shotgun, x-ray equipment, sockets to connect mission payload sensors, standard sensors, sockets for computer and auxiliary sensor interfaces, pre-programmed motions of the vehicle and arm, and task space control of the arm. The vehicle of the present invention is waterproofed.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 5(2) is a schematic diagram showing the variable configuration articulated tracked vehicle of the present invention in a generally obtuse triangular configuration;

FIG. 5(3) is a schematic diagram showing the variable configuration articulated tracked vehicle of the present invention in a generally straight configuration;

FIG. 5(4) is a schematic diagram showing the variable configuration articulated tracked vehicle of the present invention in a generally acute triangular configuration;

FIG. 25(a) to (g) are a set of schematic diagrams showing the ditch crossing process of the variable configuration articulated tracked vehicle in a generally straight configuration;

FIG. 26 is a perspective view of a compliant pulley for use in association with the variable configuration articulated tracked vehicle of the present invention; and FIG. 27 is an alternate perspective view of a compliant pulley for use in association with the variable configuration articulated tracked vehicle of the present invention.

DETAILED DESCRIPTION OF THE INVENTION

Figure 1:
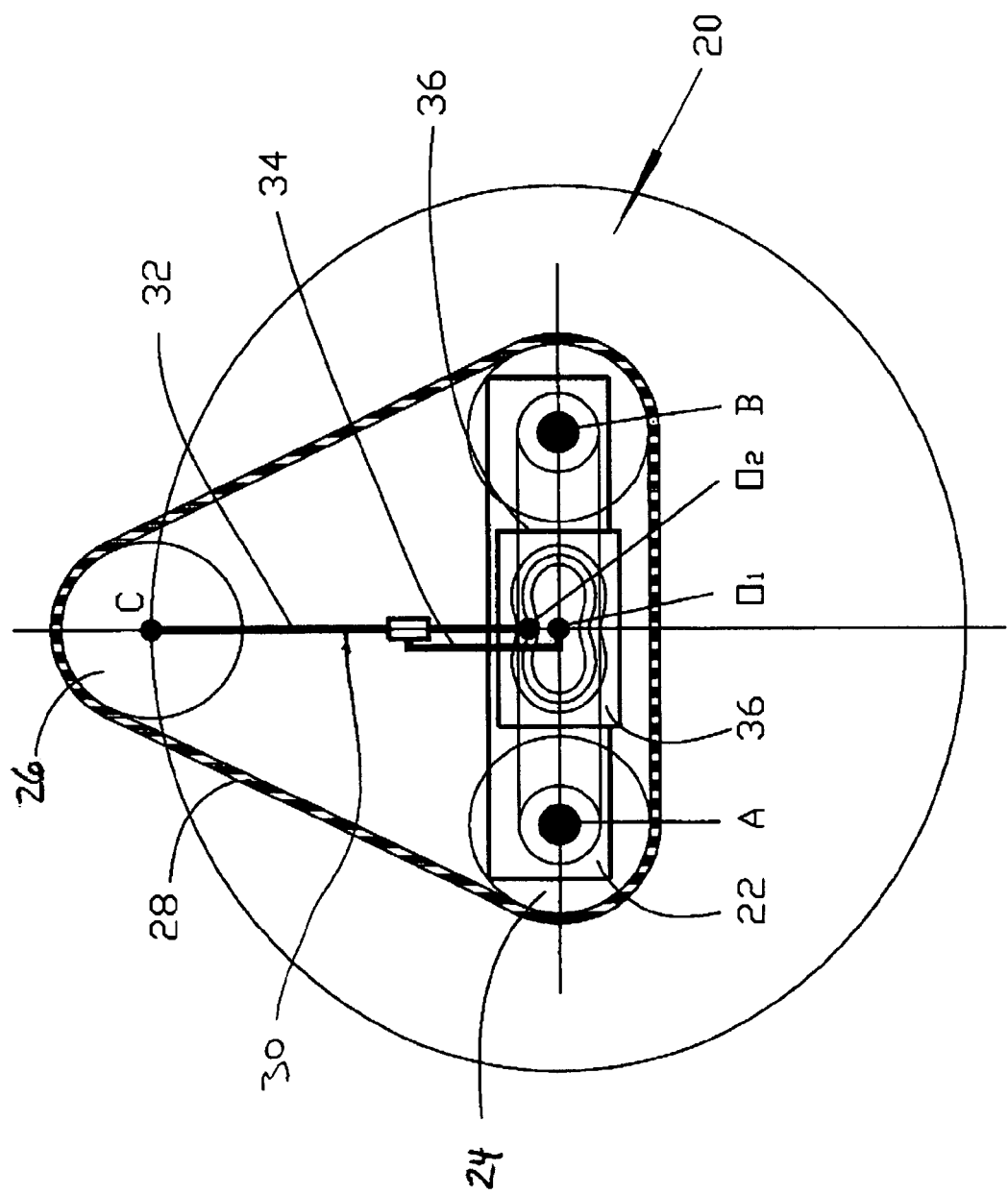
FIG. 1 is a schematic diagram of the variable configuration articulated tracked vehicle constructed in accordance with the present invention.

Referring to the schematic diagram of FIG. 1 the variable configuration articulated tracked vehicle or robot of the present invention is shown generally at 20. Vehicle 20 includes a chassis or platform 22 having pairs of wheels 24 at either end thereof, a pair of planetary wheels 26 and tracks 28. The planetary wheels 26 are each attached to the chassis with a planetary wheel arm 30 which consists of a follower 32, a crank 34 and a fixed cam 36.

The variable configuration of the tracked vehicle 20 is provided by controlling simultaneously the position of a pair of planetary wheels 26 whose location is controlled precisely by a track configuration-controlling mechanism in the form of a planetary wheel arm 30 described in more detail below. The arm 30 may also include a continuously tension control of the tracks which is described in more detail below.

Figure 2:
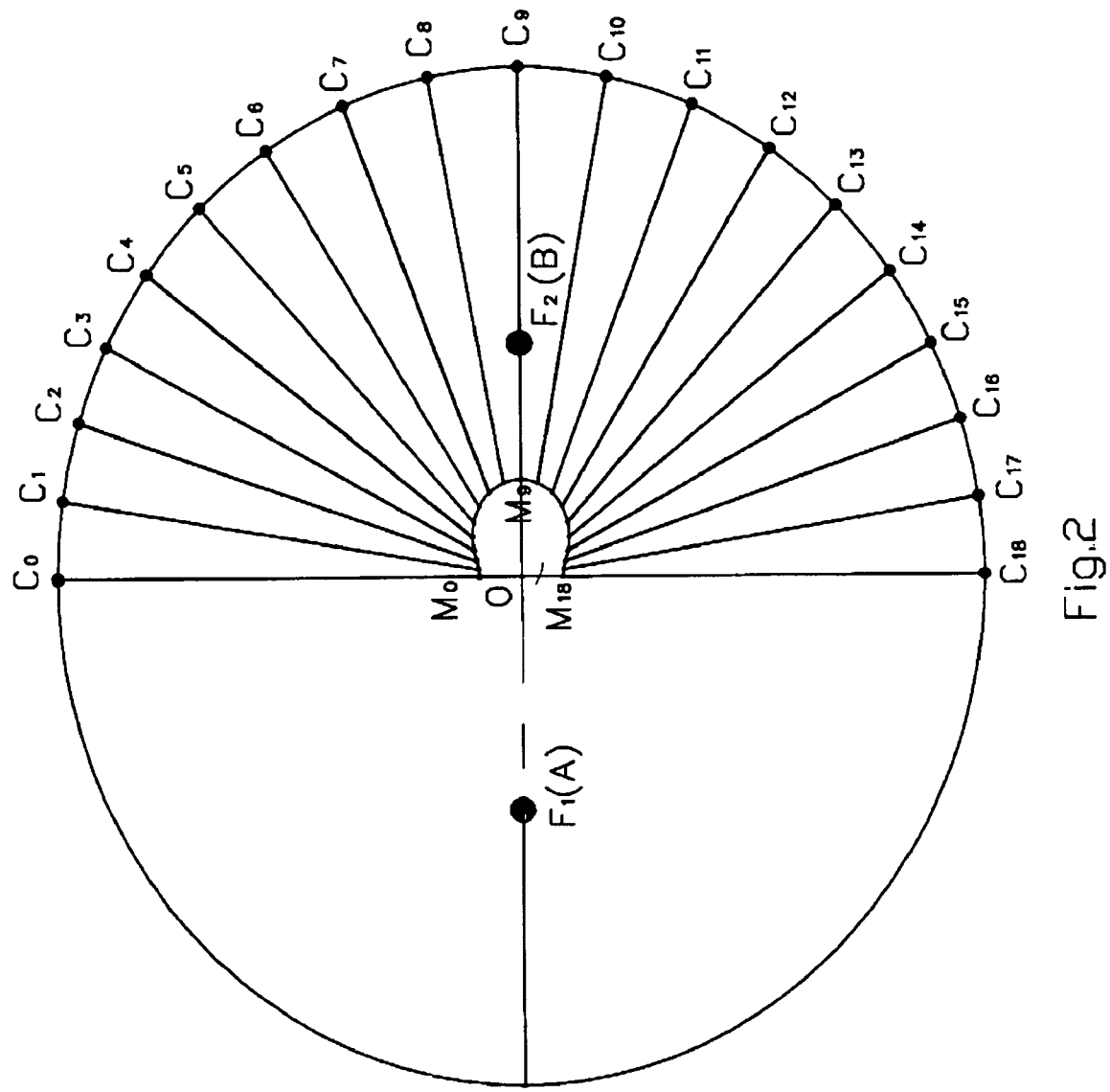
FIG. 2 is the motion trajectory of the planetary wheel of the variable configuration of the tracked vehicle of the present invention.
Figure 3:
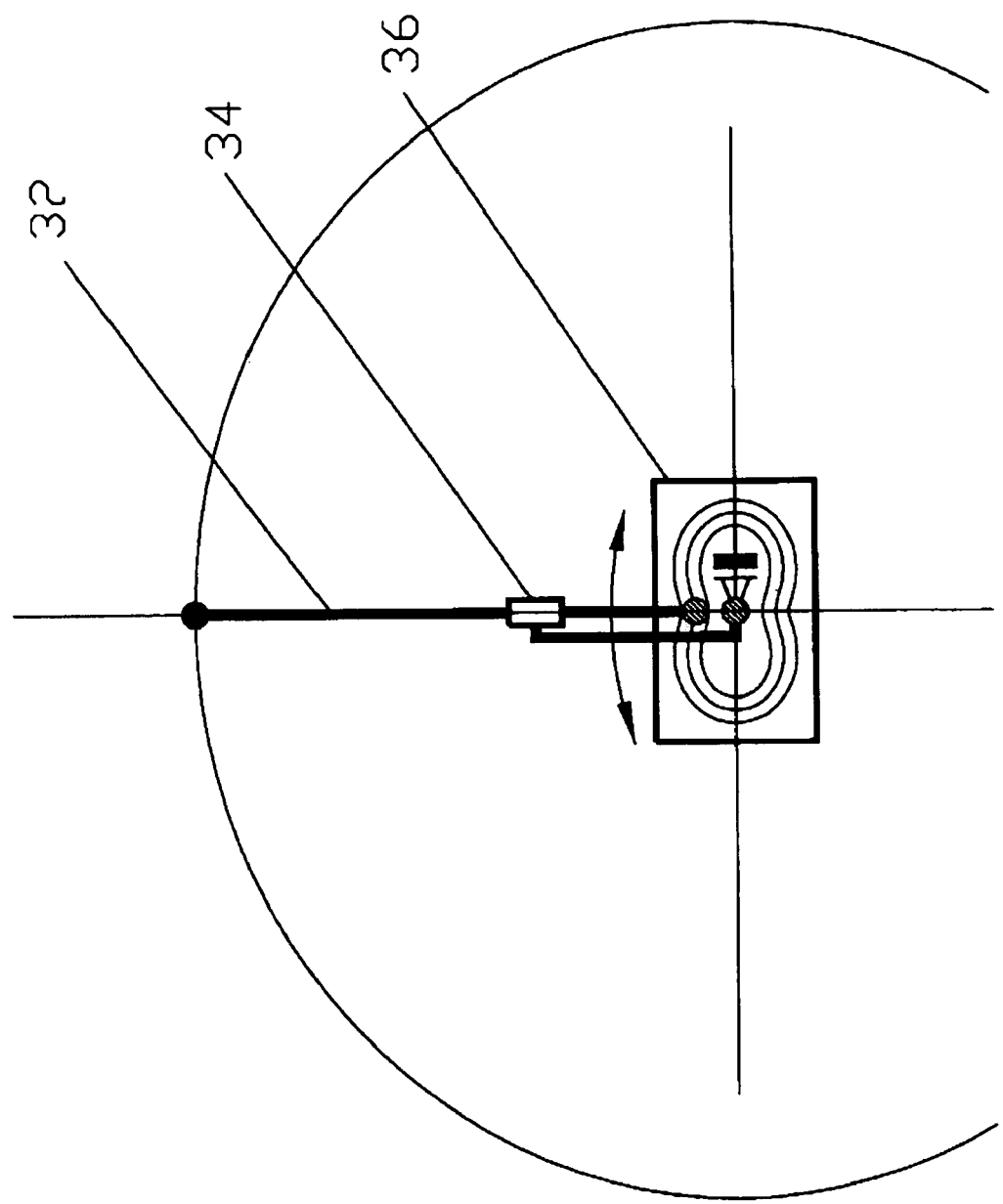
FIG. 3 is a schematic diagram of the track configuration-controlling mechanism of the variable configuration articulated tracked vehicle of the present invention.

Referring to FIGS. 1, 2 and 3, the motion trajectory of the center C of the planetary wheel 26 controlled by a planetary wheel arm 30 is an ellipse with focal points at the drive and driven wheels A, B when the diameters of all above wheels are equal. The motion path $\overline{M_0M_{18}}$ of the other ending point M of the follower 32 is obtained as shown in FIG. 2, when follower 32 turns clockwise and makes point C to move along the elliptical trajectory. The MC line of the follower 32 always goes through the revolution center O. Likewise, if the motion path of point M is controlled based on $\overline{M_0M_{18}}$ and MC line through the revolution center O is required, then point C can only move along the ellipse.

According to the above principle, the track configuration-controlling mechanism or planetary wheel arm 30, i.e. the mechanism of controlling the position of the planetary wheel 26, was designed as shown in FIG. 3. The planetary wheel arm includes a follower 32, a crank 34 and a fixed cam 36. As is well know, cam devices are versatile, and almost any arbitrarily specified motion can be obtained. The mechanism consists of two moving elements, specifically the crank 34 driven by a motor and a follower 32. The cam 36 is fixedly mounted on the chassis 22 and preferably the cam is three-bar type cam mechanism.

Preferably the three-bar cam mechanism described above is modified to include a tension control feature. Specifically, in order to realize the tension function, the track configuration-controlling mechanism is slightly modified by adding a spring 37, and dividing the follower into a tension follower 39 and a guider 41 as shown in FIG. 4.

Figure 4:
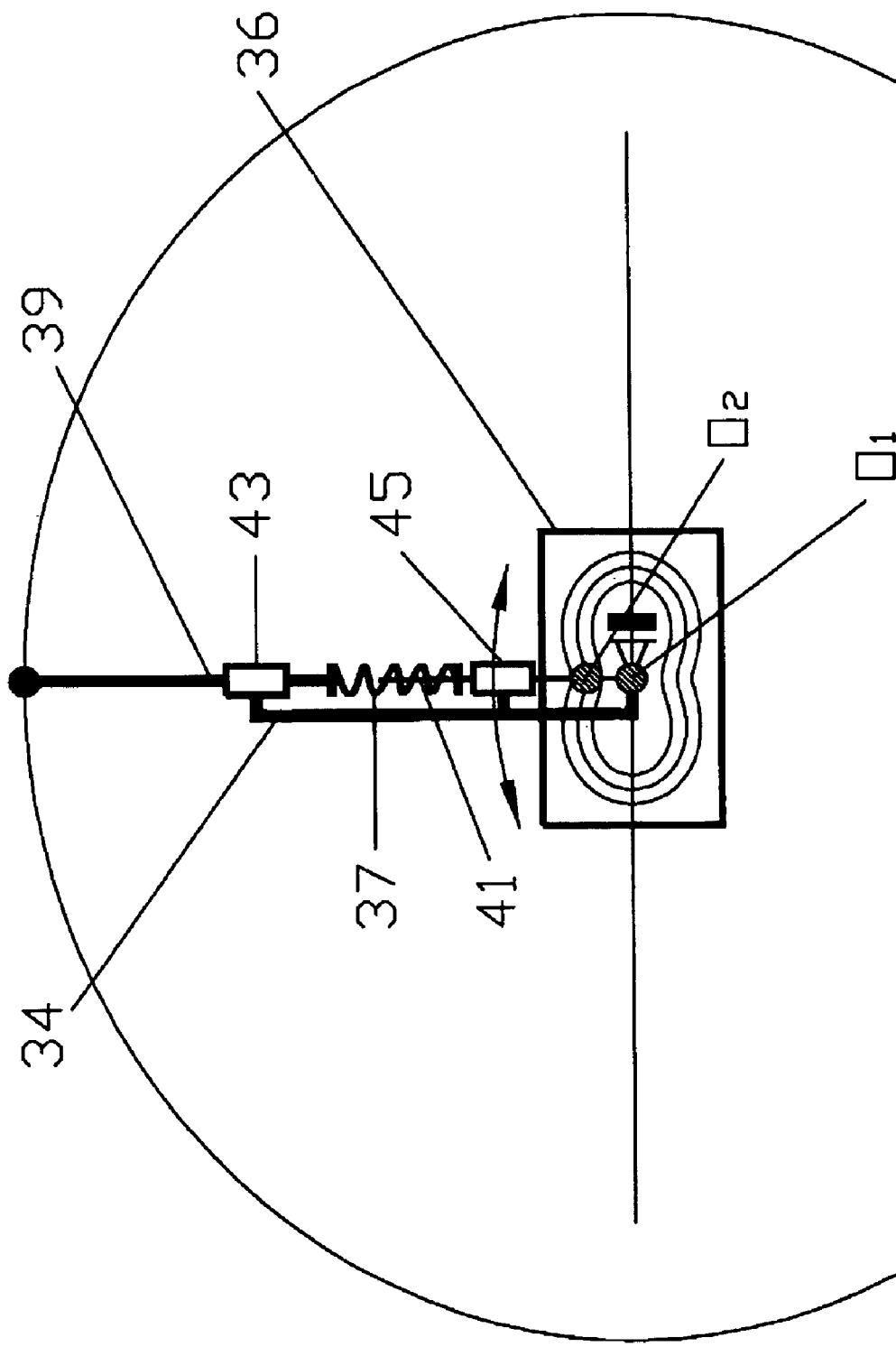
FIG. 4 is a schematic diagram of the variable configuration articulated tracked vehicle similar to that shown in FIG. 1 but also including the a tensioning mechanism.

As shown in FIG. 4, the opposed ends of the spring 37 are connected to the tension follower 39 and guider 41, respectively. The guider 41 provides the extension and compression direction of the spring 37. The crank 34 is coupled to the tension follower 39 and guider 41 by using slide pairs 43 and 45, respectively. The tension follower 39 and guider 41 can not only rotate around axis $O_2$, but also move linearly along the direction of $\overline{O_1O_2}$. Therefore, the tension follower 39 and guider 41 have the same rotating speed and orientation. During the motion of the planetary wheel, due to the constraint of the cam's profile, an elliptic trajectory of point C is achieved. As well, the distance between points C and $\overline{O_2}$ is constant. The spring provides a constant force to tension the tracks. Accordingly, the track configuration-controlling mechanism has a dual function namely controlling the configurations of the tracks and automatic tensioning of the same tracks.

Figure 5:
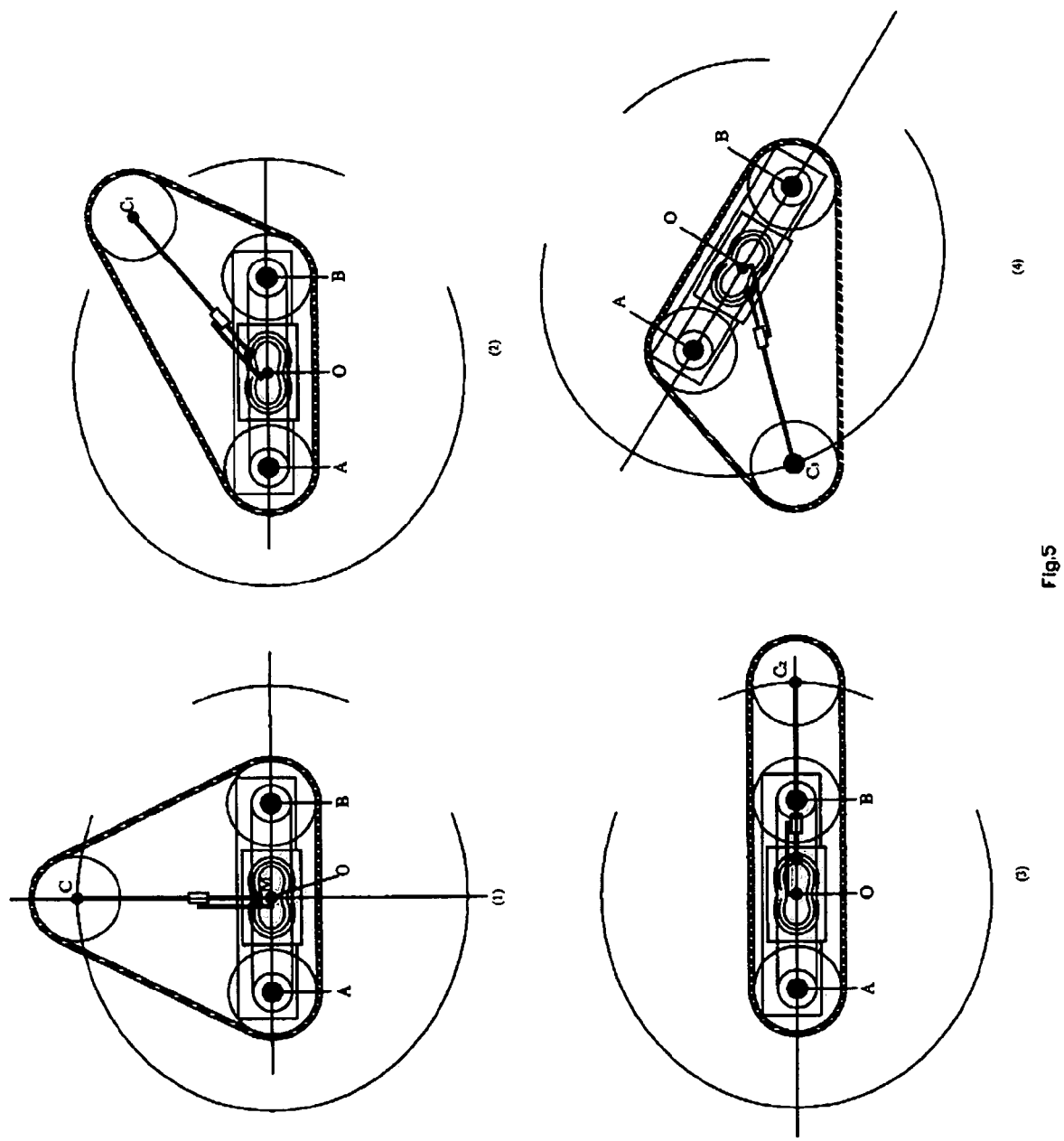
FIG. 5(1) is a schematic diagram showing the variable configuration articulated tracked vehicle of the present invention in a generally triangular configuration with the planetary wheel extending upwardly from the chassis.

It will be appreciated by those skilled in the art that the tension control feature would be advantageous in a more conventional type robot wherein the configuration is similar to that shown in for example FIGS. 5(3), 6, 8 and 9 wherein all of the pulleys are arranged in a linear fashion. In such a configuration the planetary wheel 26 need not have a full range of motion rather it would act like a tensioning pulley connected to the chassis with a tensioning arm. The tensioning arm would include a tension follower and a guider with a spring there between. The guider would be fixedly attached to the chassis.

As will be appreciated by those skilled in the art the variable configuration articulated tracked vehicle of the present invention can be easily configured so that the vehicle can be adapted to situations that arise when in use. FIG. 5 shows a few examples of different configurations. Specifically FIG. 5(1) shows a generally right angle triangular configuration, FIG. 5(2) shows an obtuse triangular configuration; FIG. 5(3) shows a straight line configuration and FIG. 5(4) shows an acute triangular configuration. These configurations are particularly useful in regard to ascending stairs, descending stairs and surmounting obstacles. As well, they are useful in increasing the height of sensors on the platform, and recovery from tumbles when the vehicle lands on its "back".

For example, firstly ascending and descending stairs or surmounting obstacles forward or backward can be realized by changing the position of the planetary wheel because the arm can turn a full revolution. Secondly, high-speed running on a flat ground can be realized when the planetary wheel is lifted since the contact area of tracks with the ground is lowered and the resistance is reduced. Additionally, stable motion moving on the soft grounds or slopes can be achieved when the planetary wheel is lowered whereby the contact area is increased, so the intensity of pressure is decreased. In particular, the orientation of the chassis platform relative to the ground can be controlled by using the track configuration-controlling mechanism. For example, the platform can be always set generally horizontality to ensure the stability of a payload mounted on the platform when vehicle climbs stairs or surmounts obstacles.

A more detailed representation of the variable configuration articulated tracked vehicle of the present invention is shown in FIGS. 6 through 9. Vehicle 40 generally includes a mobility system, standard sensing, and a communication system.

The mobility system includes a chassis 42 and a track drive system 44. The standard sensing and communication system are internal to the chassis 42. Antennas 117 and 118 are mounted on the platform. In addition, robot accessories such as a robotic arm 112 (FIG. 12), PTZ camera 116, sockets for computer and mission sensor communication, un-load payload mechanism, and light firearms may be attached to the chassis 42.

The mobility system includes a pair of tracks drive systems 44 on either side of the chassis 42. Each track drive system 44 includes pair of drive pulleys 46, a track or belt 48, a skid 63, and a planetary wheel 50. The drive pulleys 46 are positioned at either end of the chassis 42 and are in the same plane. Preferably the drive pulleys all have the same outside diameter. One of the drive pulleys 46 is driven by the motor 52 and the other is a follower drive pulley 46. They are connected by a chain. Each track drive system 44 is controlled independently. Each system 44 has a motor 52 operably attached to one of the pair of drive pulleys 46 (best seen in FIGS. 8 and 9). The motor 52 is operably attached to a gear 54 and a break 56. An encoder 58 is operably attached to the track drive system 44. The drive pulleys 46 are connected through sprockets and chains. Skids 63 are positioned between the drive pulleys 46 to support the belt 48.

Figure 9:
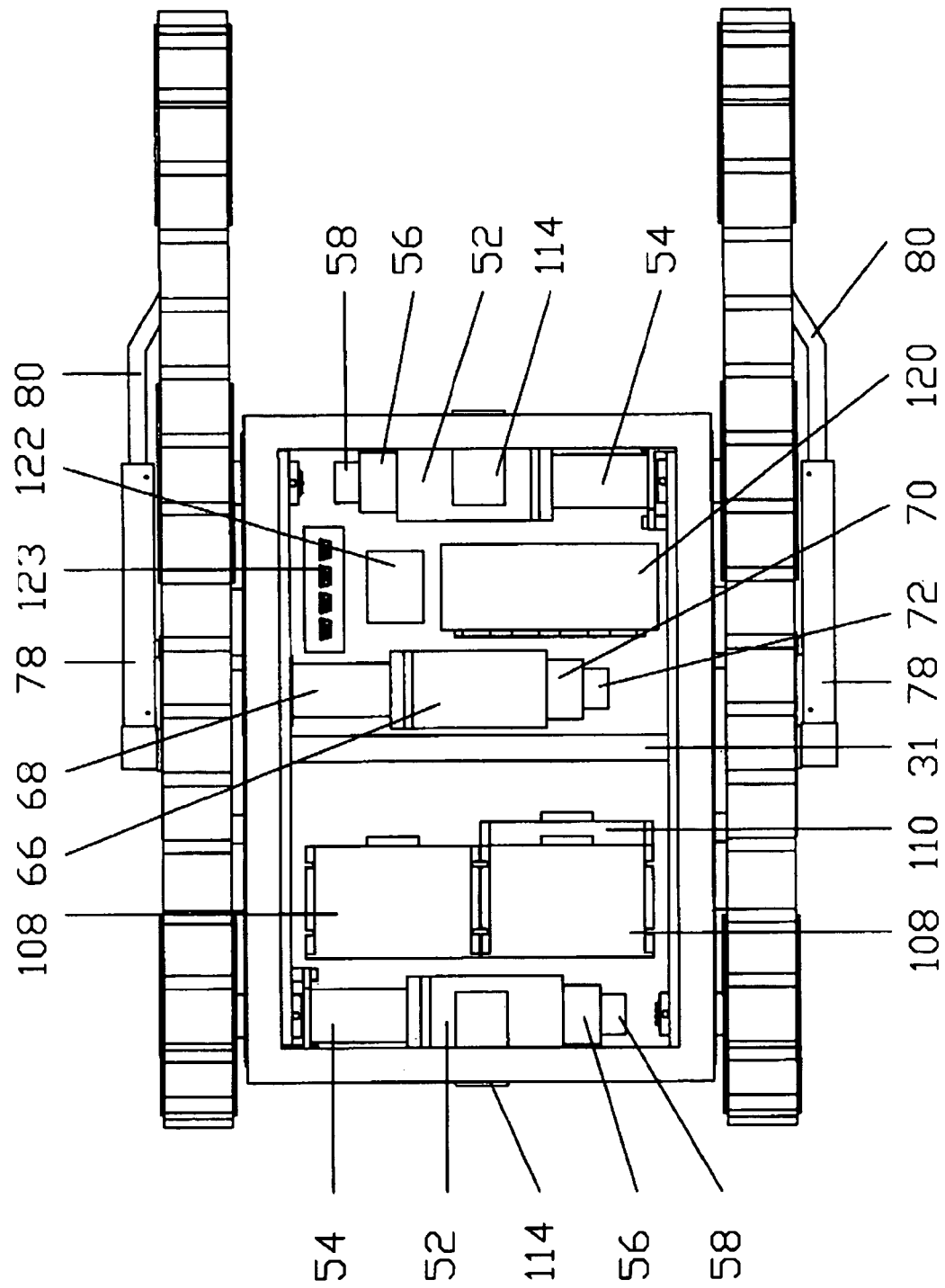
FIG. 9 is a top view of the variable configuration articulated tracked vehicle of FIG. 5 shown with the chassis cover removed.
Figure 10:
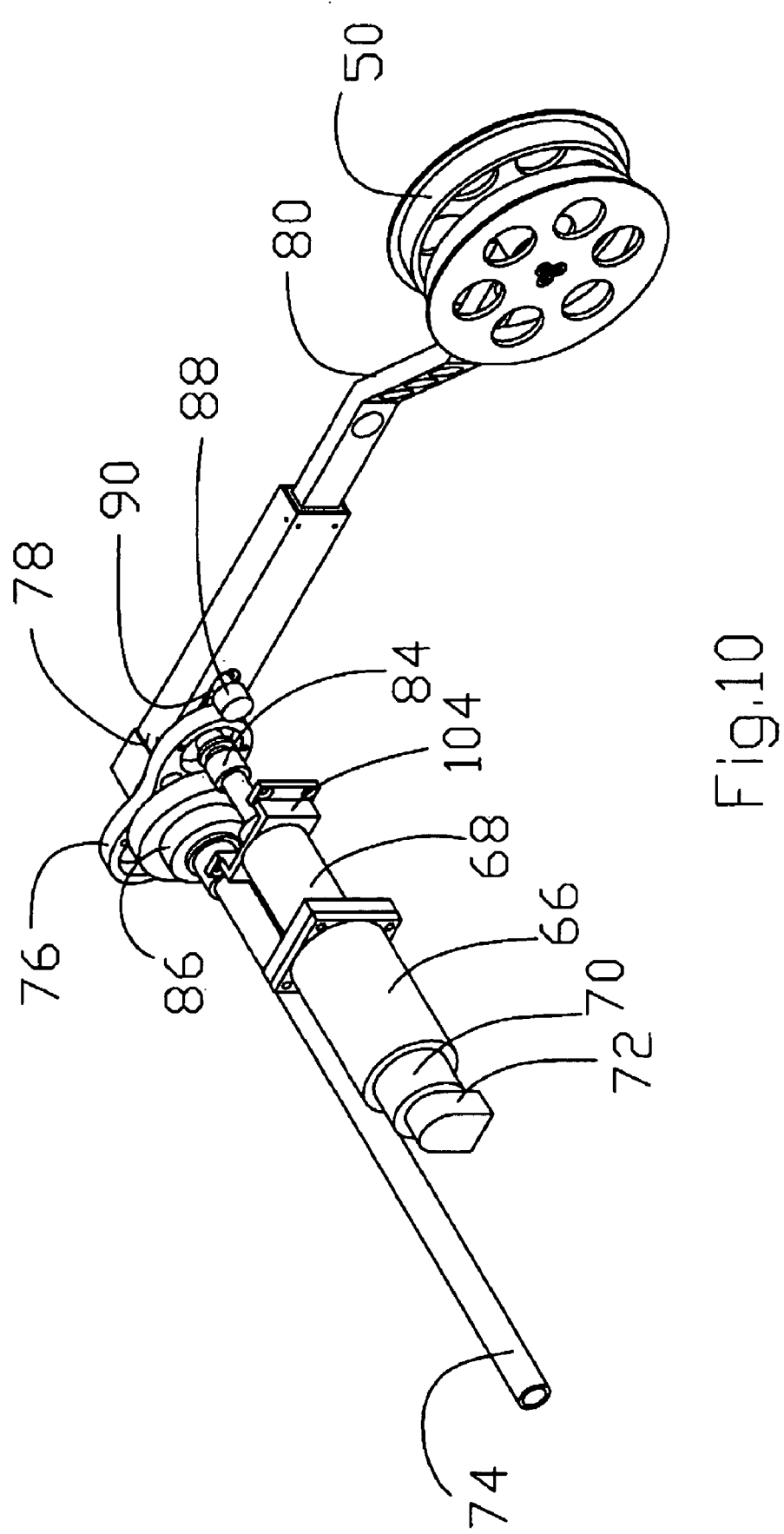
FIG. 10 is a perspective view of the planetary wheel arm of the variable tracked vehicle of the present invention.
Figure 11:
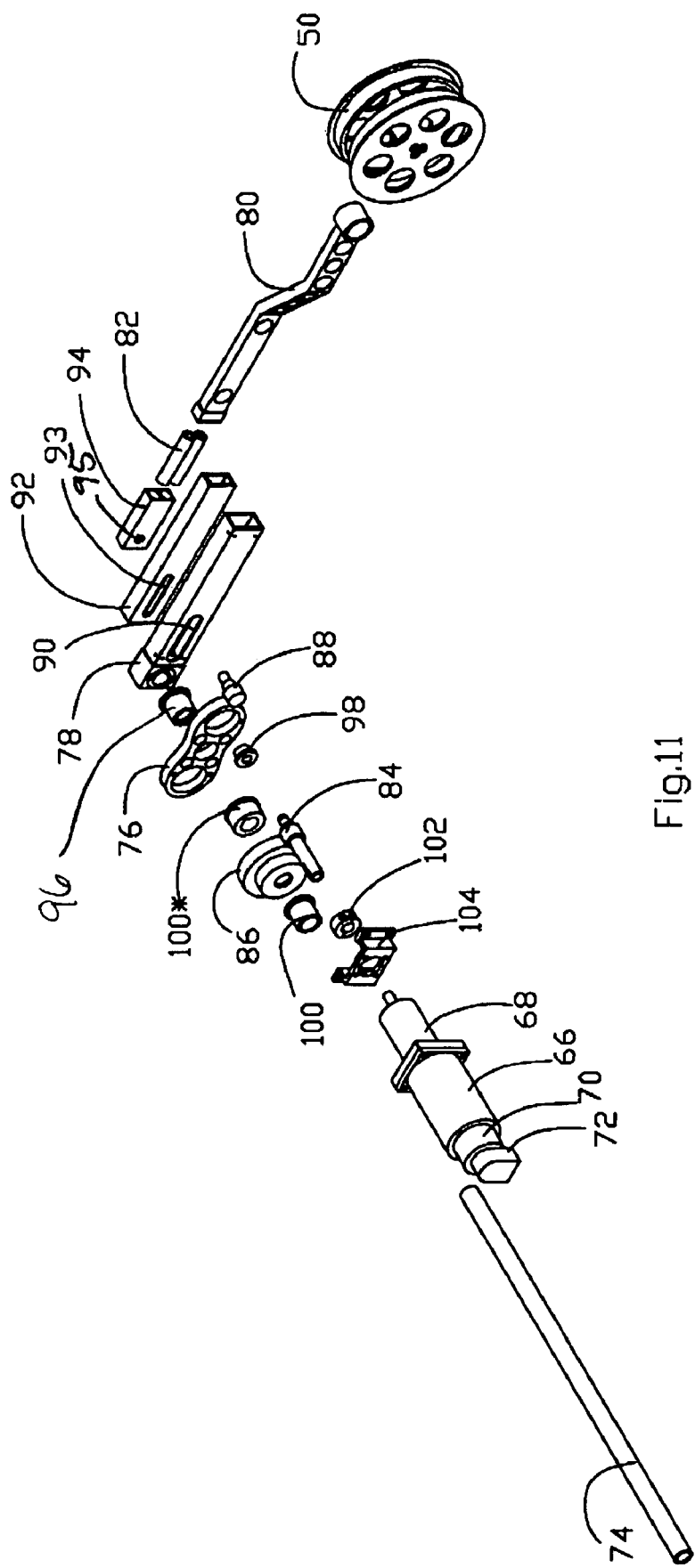
FIG. 11 is a blown apart perspective view of the planetary wheel arm.

A planetary wheel arm 64 positions each planetary wheel 50 in the user defined position along the elliptical trajectory. The planetary wheel 50 is the same plane as the plane as the drive pulleys 46 on the respective sides of the chassis 42. Planetary wheel arm 64 is driven by an arm motor 66 (FIG. 9). Arm motor 66 is operably attached to an arm gear 68, an arm break 70 and an arm encoder 72. The planetary wheel arms 64 are connected together with an arm main shaft 74 (FIG. 10). Accordingly, movement of the arm main shaft 74 effectively moves the right and left planetary wheels in concert. The planetary wheel arm 64 includes a cam 76, a crank 78 and a follower 80. The crank 78 is operably attached to the arm main shaft 74 through cam 76. The follower 80 is slidingly engaged in crank 78. A spring 82 (shown in FIG. 11) biases the follower 80 outwardly such that tension is maintained on track 48. A small ground spur gear 84 and a large ground spur gear 86 operably connect the arm drive motor 66 to the main shaft 74. A track roller 88 is attached to the cam 76. Track roller 88 is connected to the follower-roller base through an aperture 90 in the crank 78. Spring 82 serves to continuously passively tension track 48.

Preferably the skids 63, the pulleys 46 and the planetary wheels 50 are compliant such that a vehicle 40 can withstand a free fall from a height of approximately 2 meters. An example of an innovative compliant pulley 140 is shown in FIGS. 26 and 27. However, it will be appreciated by those skilled in the art that other compliant pulleys could also be used. Compliant pulley 140 includes a generally rigid hub 142 connected to the shaft. A plurality of resiliently deformable spokes 144 are connect the hub 142 to the rim 146. The rim 146 is generally rigid. The connection 148 between the rim 146 and the spokes 144 allows for a predetermined displacement. Each connection 148 has a rim portion 150 extending inwardly from the rim 146 joined to a spoke portion 152 connected to the spoke 144. Rim portion 150 and spoke portion 152 may move relative to each within a predetermined range. Accordingly, on impact the spokes 144 will deform and the connections 148 will move such that the rim 146 will move relative to the hub 142.

The blown apart view of the planetary wheel arm 64 (FIG. 11) shows further detail of the arm 64. A crank bearing 92 is positioned inside crank 78. The crank bearing 92 has an aperture 93 which is in registration with aperture 90 in the crank 78. A follower roller base 94 is attached to spring 82 which is attached to follower link 80. This assembly is attached to track roller 88 at 95 through aperture 93 in crank bearing 92 and through aperture 90 in crank 78. The main shaft 74 has a main shaft sleeve bearing 96. A small spur bushing 98 is attached to small ground spur gear 84. Two heavy duty keyless bushings 100 are connected to the main shaft 74. A clamp on shaft collar 102 is connected to the arm motor gear 68. An arm motor mount 104 is operably connected to the arm motor 66.

There is an on board battery 106 (FIG. 7) that is operably connected to motors 52 and arm motor 66. A controller 108 (FIG. 8) is operably connected to motors 52 and arm motor 66. Three amplifiers 110 are connected to controller 108. A user could use a joystick 130 (shown in FIG. 6) for controlling the motion of vehicle 40. The joystick could be hardwired to the vehicle or connected to the vehicle in a wireless manner.

Figure 12:
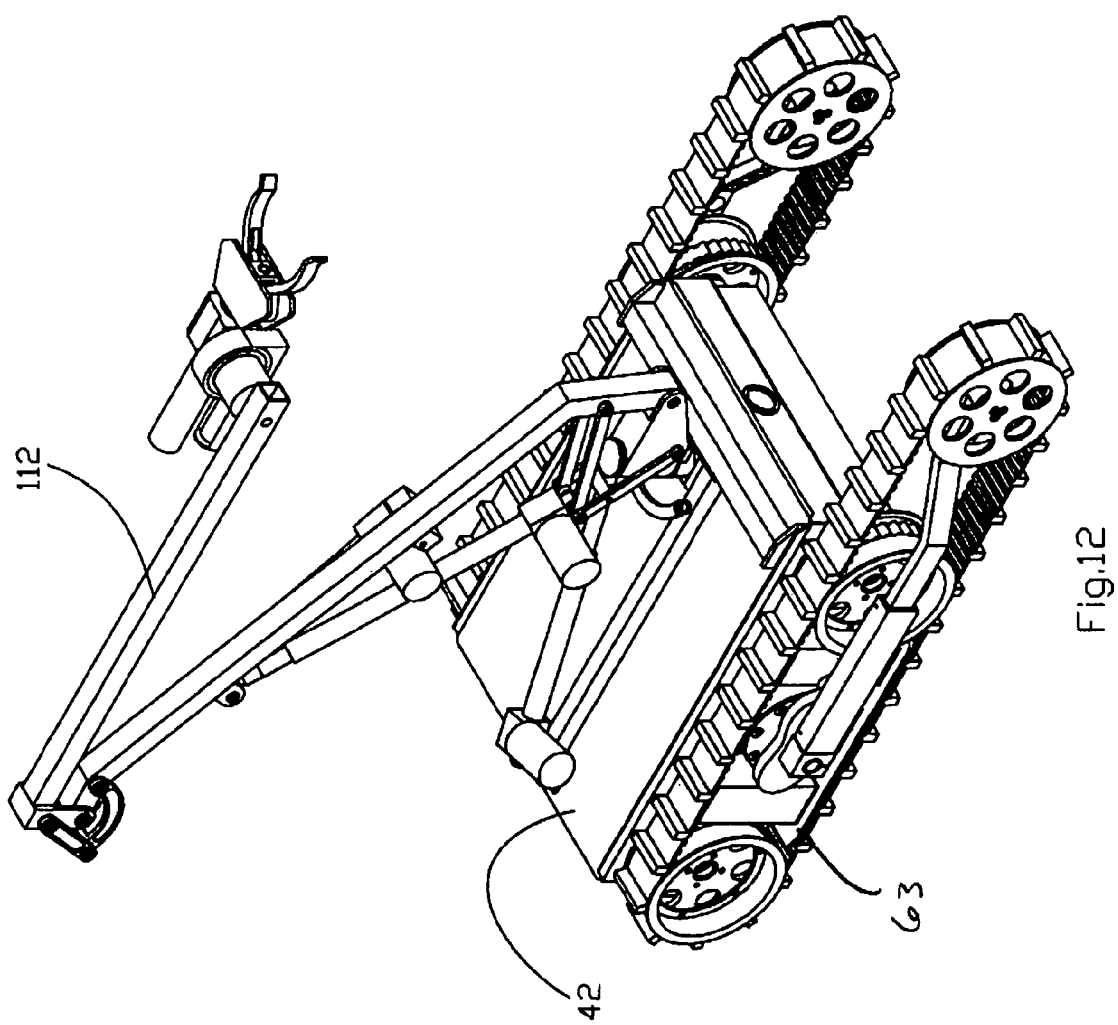
FIG. 12 is a perspective view of the variable configuration articulated tracked vehicle of the present invention shown with an arm in a raised position.
Figure 13:
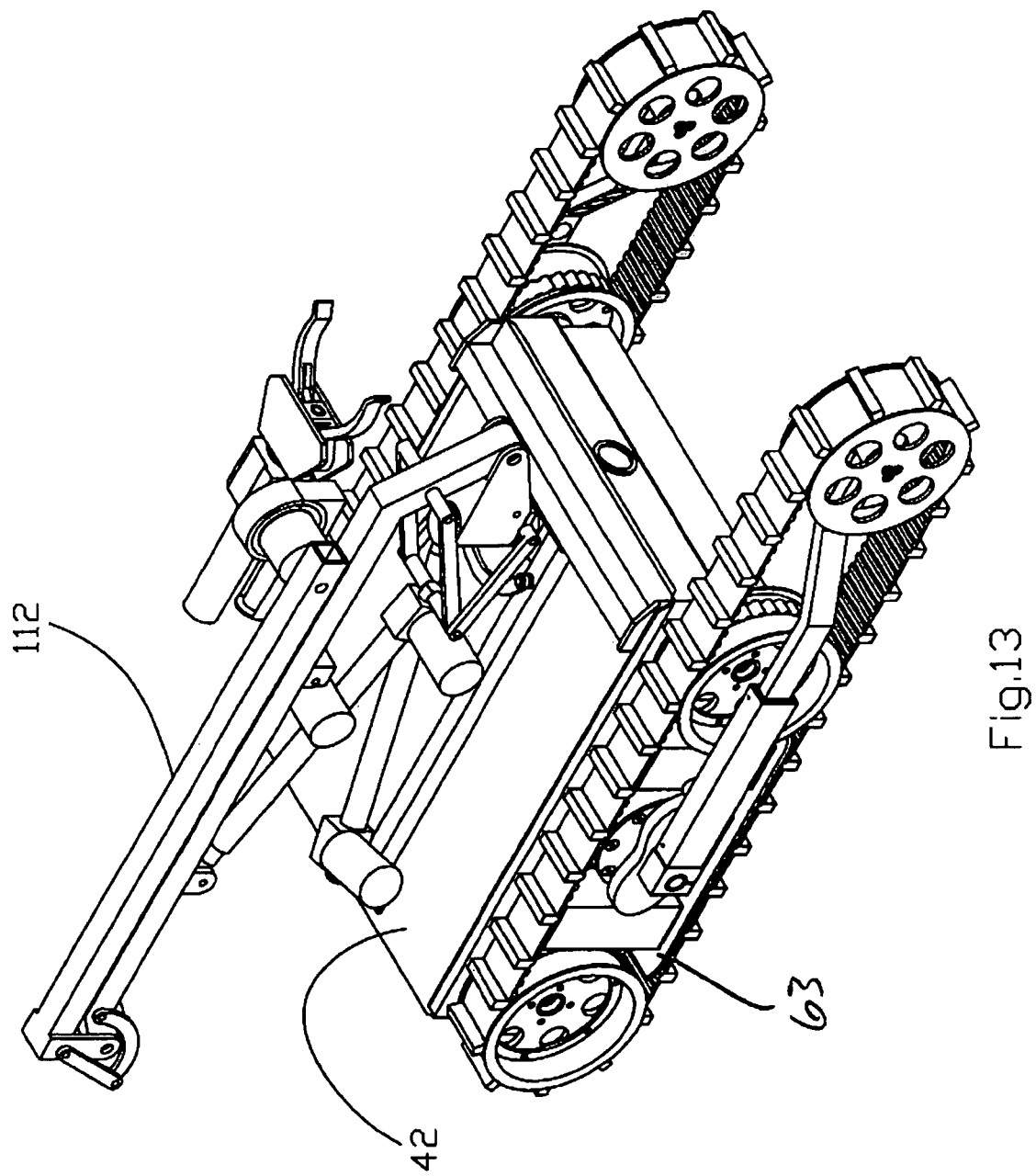
FIG. 13 is a perspective view of the variable configuration articulated tracked vehicle of the present invention shown with an arm in a stowed position.
Figure 14:
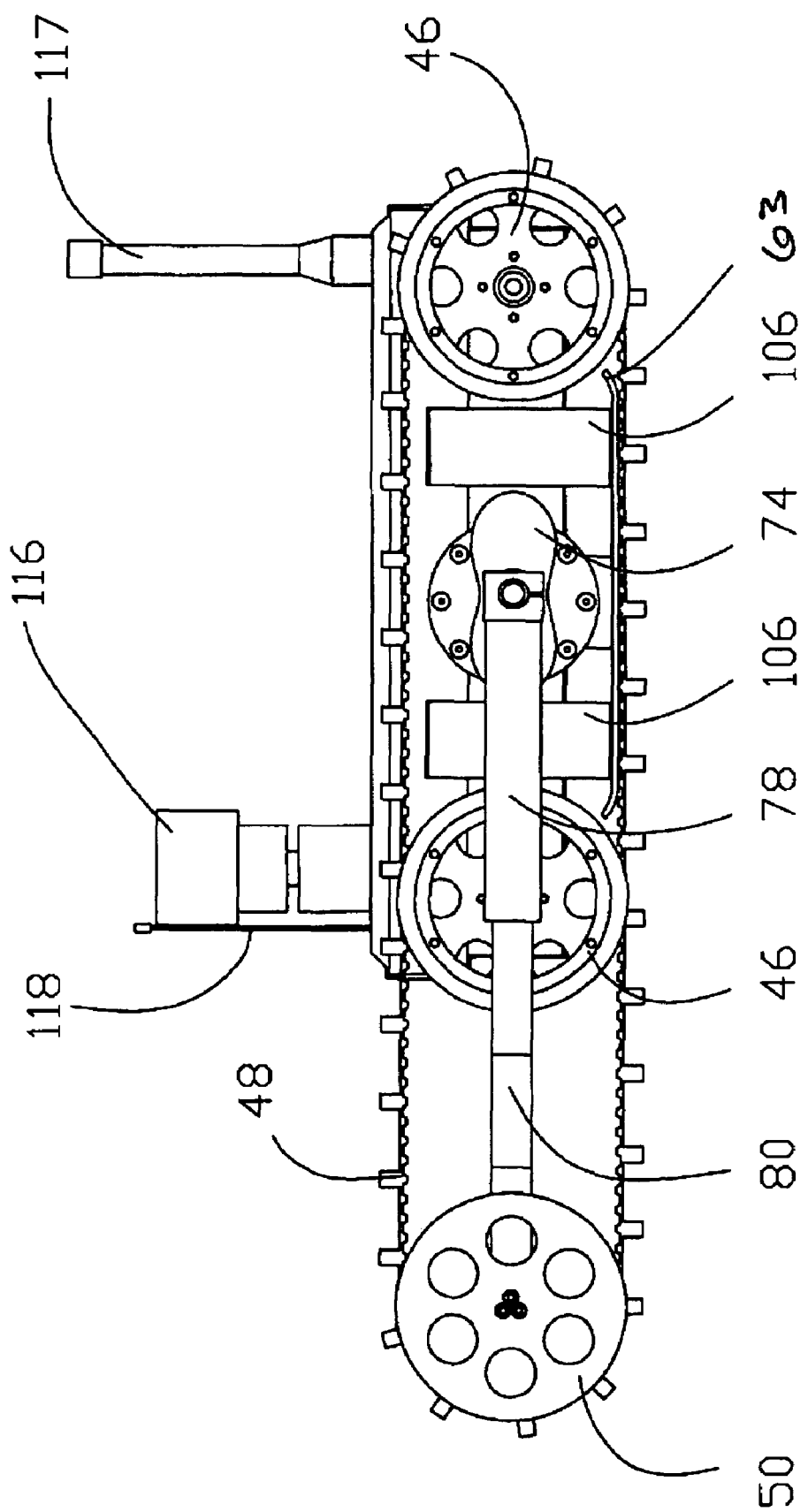
FIG. 14 is a side view of the variable configuration articulated tracked vehicle of the present invention shown with a PTZ and two antennae.
Figure 15:
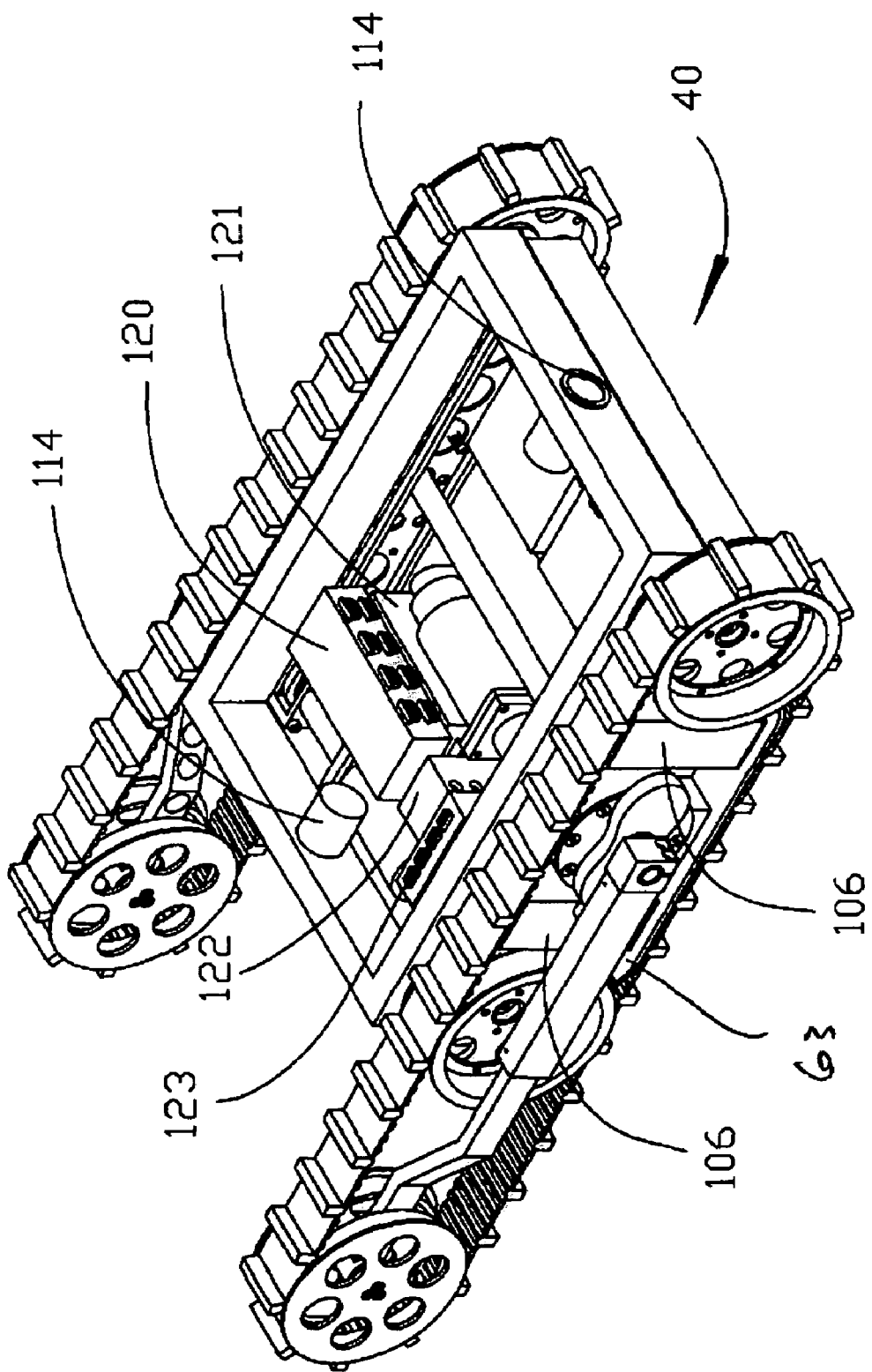
FIG. 15 is a top perspective view of the variable configuration articulated tracked vehicle of FIG. 14 with the chassis cover removed.
Figure 16:
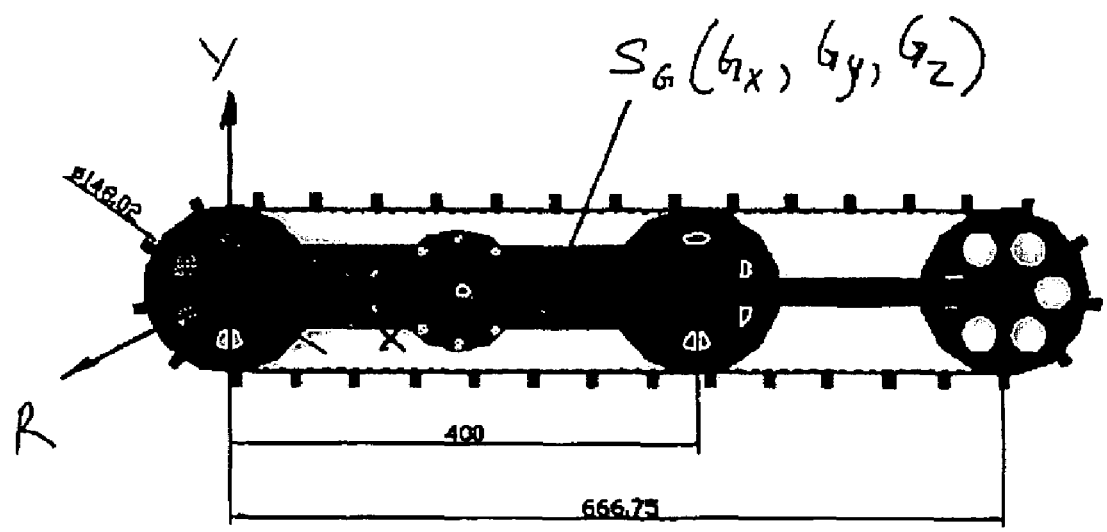
FIG. 16 is a schematic diagram showing the centre of gravity when the variable configuration articulated tracked vehicle of the present invention is in a generally straight configuration.
Figure 17:
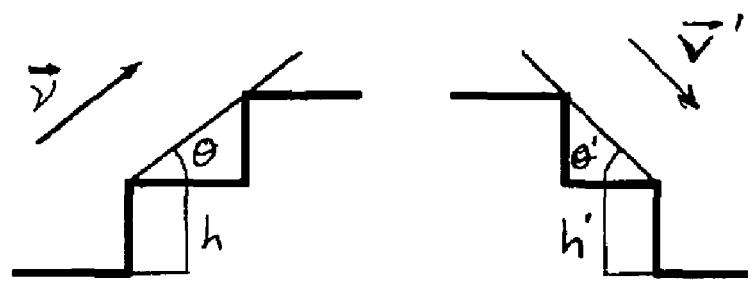
FIG. 17 is a schematic diagram showing the height and inclination of stairs.

It will be appreciated by those skilled in the art that a variety devices may be attached to the chassis 42. Some examples of devices attached thereto are shown in FIGS. 12 through 15. Specifically, FIGS. 12 and 13 show the variable configuration articulated tracked vehicle of the present invention with a robotic arm 112 attached to the chassis 42. In FIG. 12 the arm 112 is in an arbitrary configuration and in FIG. 13 it is in the retracted position. Alternatively FIGS. 14 and 15 show the variable configuration articulated tracked vehicle of the present invention with two cameras 114 (front and back), a PTZ 116 and an payload un-load mechanism (not shown) attached to the chassis 42. There are also sockets 120 for RS232, RS485, Ethernet hub 123, and USB communication, and standard sensors 121: temperature, compass, inclinometer, GPS, and battery status. In the chasis there are also front and back cameras 114 and RF equipment 122. Preferably the audio/video antenna 117, data antenna 118, PTZ camera 116, arm 112, mission sensors, and disrupters and laser pointers are outside the chassis.

It should be noted that the variable configuration articulated tracked vehicle of the present invention can be scaled up or down as desired. For example the vehicle could be small enough to be carried by an individual in a back pack. A medium version could also be carried by one person or more persons and a large version could be carried by two or more persons. The larger version would carry disrupters, x-ray instruments, other EOD (explosive ordnance disposal) neutralization devices, and would have a larger payload capability arm. Further the design is such that the manufacturing costs are relatively low. As well since the vehicle is comparatively simple maintenance and repair is relatively simple.

Preferably, the track drive system 44 is modular with respect to the chassis 42, and it can be replaced by ordinary wheels (no planetary wheels) for higher speed on nearly flat surfaces.

Figure 6:
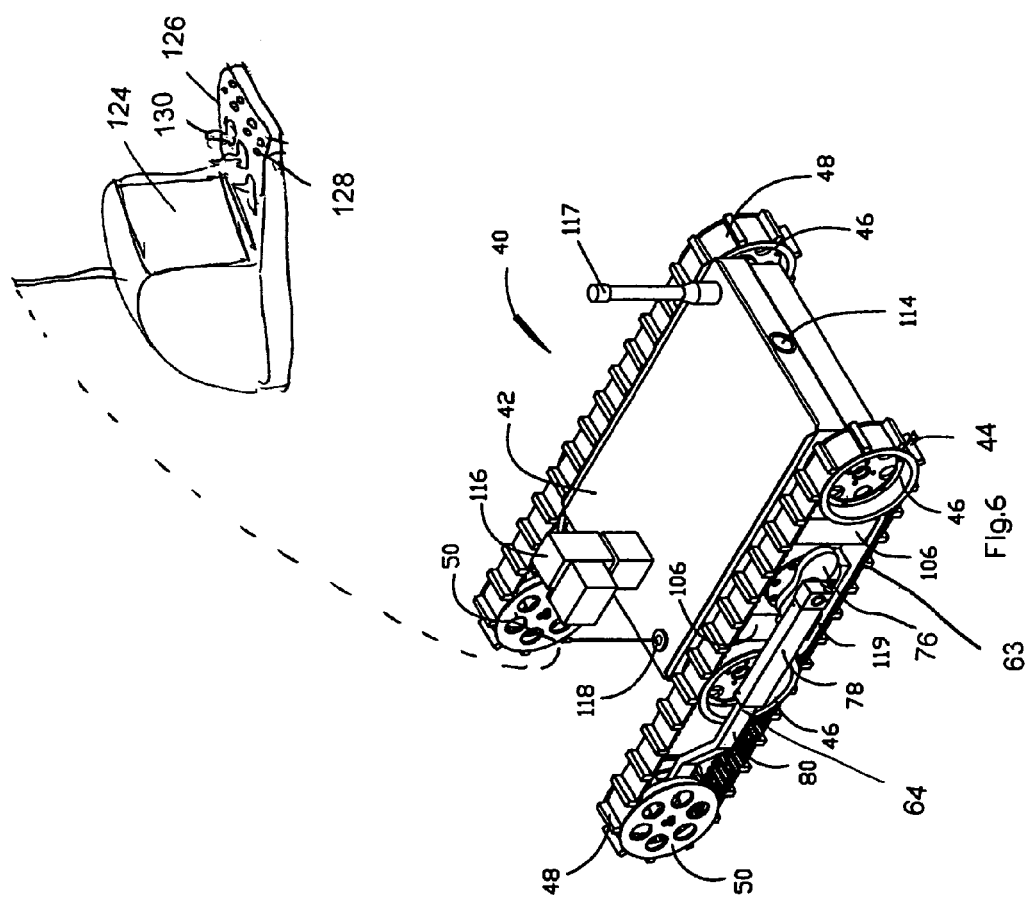
FIG. 6 is a perspective view of the variable configuration articulated tracked vehicle constructed in accordance with the present invention and showing the planetary wheel in the straight configuration.
Figure 7:
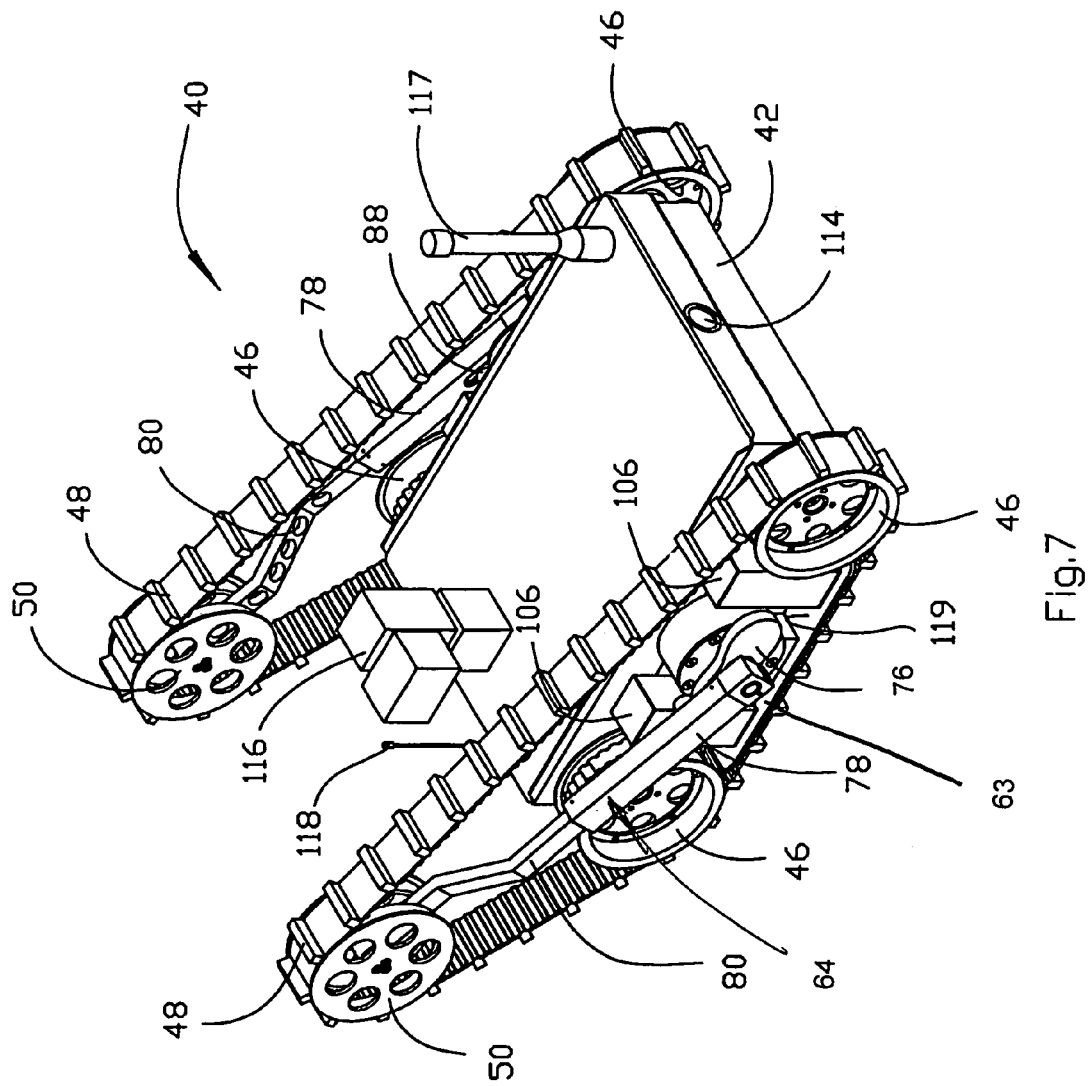
FIG. 7 is a perspective view of the variable configuration articulated tracked vehicle of FIG. 5 showing the planetary wheel set for climbing in obtuse configuration.
Figure 8:
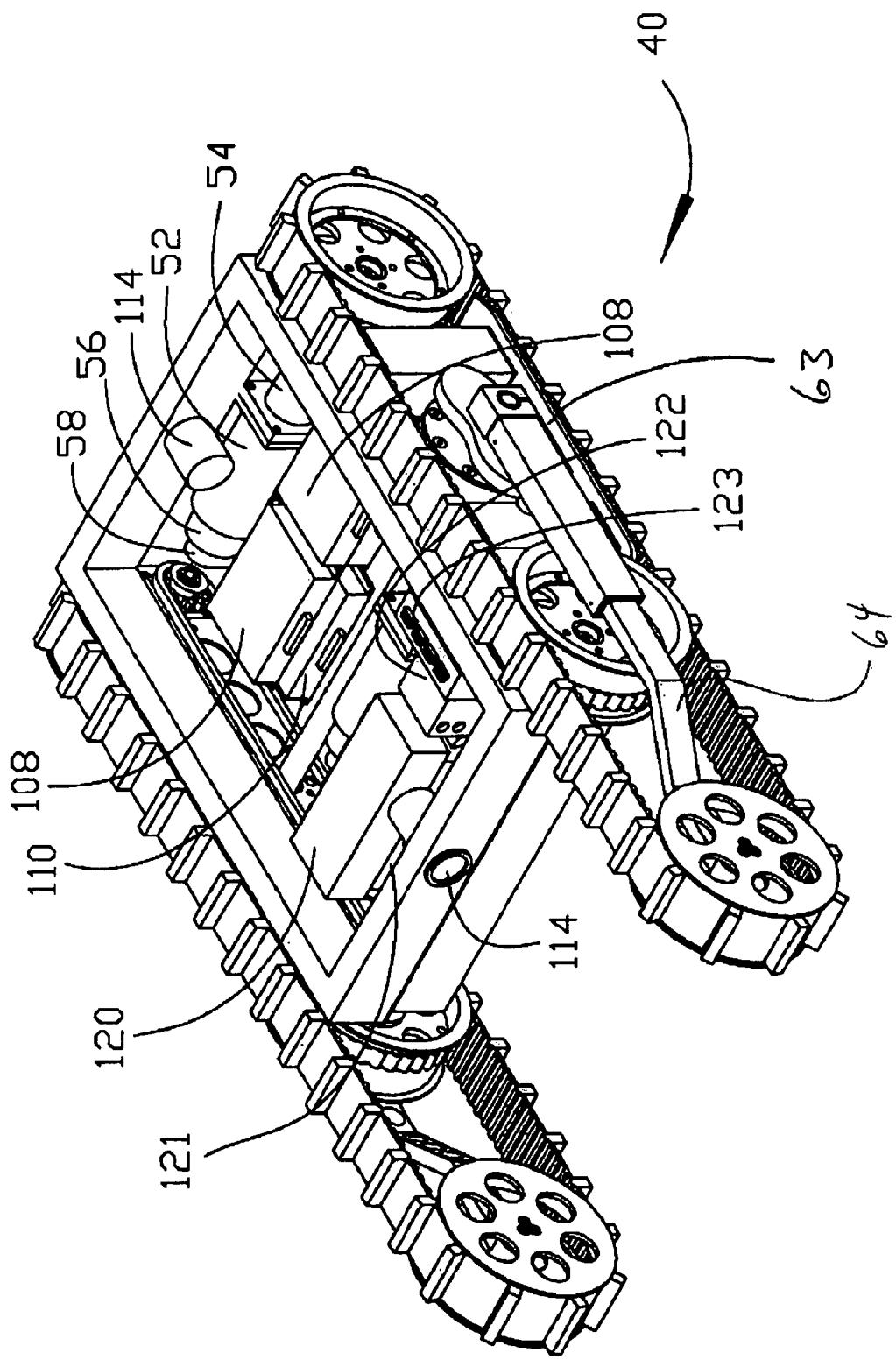
FIG. 8 is a perspective view of the variable configuration articulated tacked vehicle of FIG. 5 shown with the chassis cover removed.

It will be appreciated by those skilled in the art that the vehicle of the present invention is designed to be operated remotely. The operator would use a graphical user interface 124 with a control panel 126 as shown in FIG. 6. The control panel would preferably include a plurality of buttons 128 and at least two joysticks 130. The buttons 128 are used for pre-programmed functions. There is one joystick 130 for controlling the chassis 22 and another joystick is for controlling the robotic arm 112. A third joystick may also be included for controlling the wrist 113 of the robotic arm 112. The graphical user interface would either be hard wired to the vehicle or connected through radio frequency or other connection. In order to facilitate the operation of the vehicle of the present invention there are a number of pre-programmed operations that may be included in the control software. Specifically the vehicle may be pre-programmed such that a one button command deploys the robotic arm 112 to predetermined locations and another one button command stows the robotic arm 112. As well there may be pre-programmed motion commands wherein a one button command will move the chassis in a straight line from point A to point B. Such motion may be corrected using a GPS system to ensure that the robot is on track. Another one button command could move the vehicle in circle with a selected radius, with a zero radius turning the vehicle on the spot. Similarly a GPS system may be used to ensure that the robot is on track. Preferably the robotic arm is controlled in task-space and a joystick is used to input commands in gripper coordinates instead of joint by joint.

It will be appreciated by those skilled in the art that the vehicle of the present invention provides many advantages (passive track tensioning; COG relocation for added dexterity in climbing stairs, surmounting ditches, and compliance to impact). In particular the vehicle of the present invention can ascend and descend stairs and surmount obstacles forward or backward. As well, the orientation of the platform or chassis relative to the ground can be controlled by the user such that it may be inverted without disturbing its operation. Also, the location of the centre of gravity can be adjusted for stable travel on stairs by rotating the planetary arm. The vehicle of the present invention allows for high-speed operation on flat ground. In addition, the vehicle of the present invention provides stable motion on soft ground, stairs or slopes. As discussed, spring 82 continuously passively tensions track 48. This is an advantage over the prior art wherein the position of the wheel has been continuously monitored to ensure that there is sufficient tension on the track.

As set out above one of the advantages of the variable tracked vehicle of the present invention is that it has a centre of gravity that can be varied depending on terrain shape. The variation is achieved by controlling the location of the planetary wheel. Other advantages of the present vehicle are that the planetary wheel mechanism provides improved characteristics in regard to stair climbing, surmounting obstacles and ditch crossing, and generally rough terrain motion, by providing continuous tensioning of the track belt in any configuration of the planetary wheel.

Referring to FIGS. 16 through 25 following is a comparison of the present invention to the prior art vehicle shown in U.S. Pat. No. 6,263,989 issued to Won on Jul. 24, 2001 and related patents. Two related aspects are the vehicle's ability to ascend and descend stairs and its ability to surmount obstacles. The results of the comparison show that the vehicle of the present invention has apparent superiority over Won vehicle.

The variation of the location of COG (center of gravity) is an important design index for a robot. The location of the COG enables providing stability in certain challenging maneuvers such as climbing and self-righting. Therefore, by analyzing the location of COG the stability of the vehicle while moving on a stair or surmounting an obstacle the advantages of the present invention over the prior art can be demonstrated.

According to the principle of force and moments balance, the COG of a mobile robot should meet the following structural conditions in order to ensure that the mobile robot can stably ascend and descend stairs:

$$\text{Design\_equation} \begin{cases} \text{Moving-upstairs:} \dfrac{h}{\sin\theta} + (G_Y + R)\cdot tg\theta \leq & (1) \\ \quad G_X \leq L' - \dfrac{h}{\sin\theta} + (G_Y + R)\cdot tg\theta \\ \text{Moving-downstairs:} \dfrac{h'}{\sin\theta'} - (G_Y + R)\cdot tg\theta' \leq \\ \quad G_X \leq L' - \dfrac{h'}{\sin\theta'} - (G_Y + R)\cdot tg\theta' \end{cases}$$

Where, h, h'—heights of up-stairs and down-stairs, respectively.

θ, θ'—ascending degree and descending degree of stairs, respectively.

θ'—descending degree of stairs.

$G_X$, $G_Y$, $G_Z$—the location parameters of the COG($S_G$).

L', R—the structural parameters of the mobile robots.

According to equation (1), the conditions for a robot to stably move on stairs that have a height of 200 mm and an inclination of 45 are:

$$\begin{cases} \text{upstairs: } 356.96 \leq G_X \leq 458.02(400)\,\text{mm} \\ \text{downstairs: } 208.72 \leq G_X \leq 309.79\,\text{mm} \end{cases}$$

Figure 18:
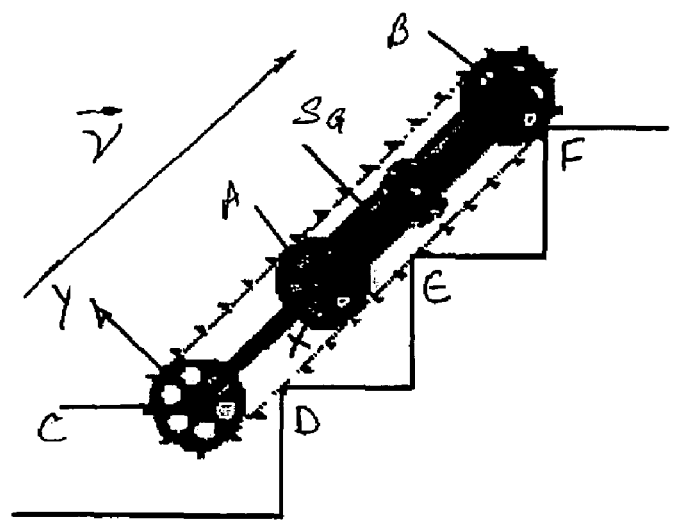
FIG. 18 is a schematic diagram of the variable configuration articulated tracked vehicle in a generally straight configuration ascending stairs.
Figure 19:
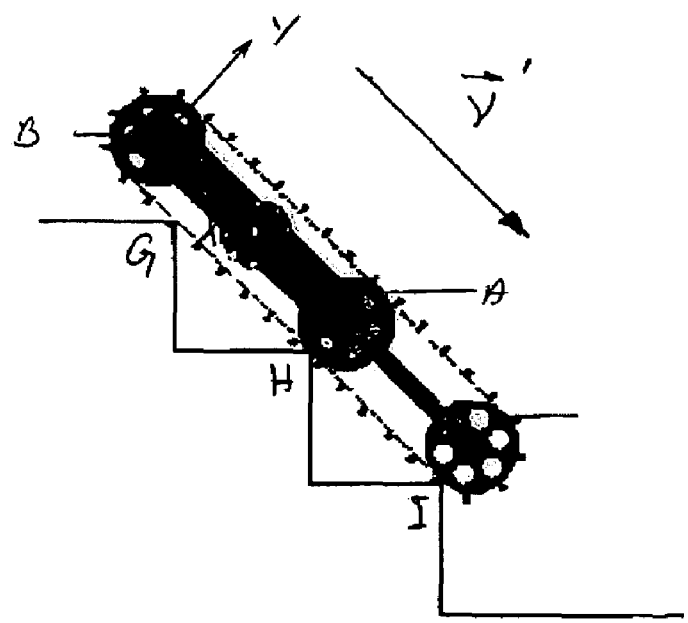
FIG. 19 is a schematic diagram of the variable configuration articulated tracked vehicle in a generally straight configuration descending stairs.

One of the main advantages of the mobile robot of the present invention is that its COG is changeable in a greater range by adjusting the position of the planetary wheels, thus meeting the above condition. As shown in FIGS. 18 and 19, reasonable COG locations can be attained with the mobile robot of the present invention for stably ascending and descending stairs, respectively:

$$\begin{cases} \text{upstairs: } G_X = 389.25\,\text{mm} \\ \text{downstairs: } G_X = 277.50\,\text{mm} \end{cases}$$

Figure 20:
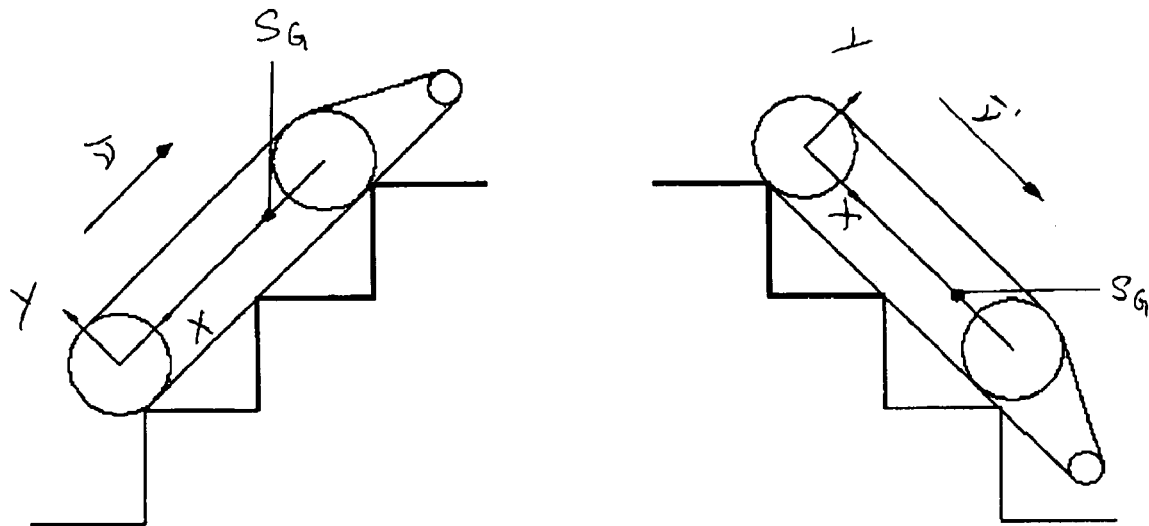
FIG. 20 is a schematic diagram of a prior art robot ascending and descending stairs.
Figure 21:
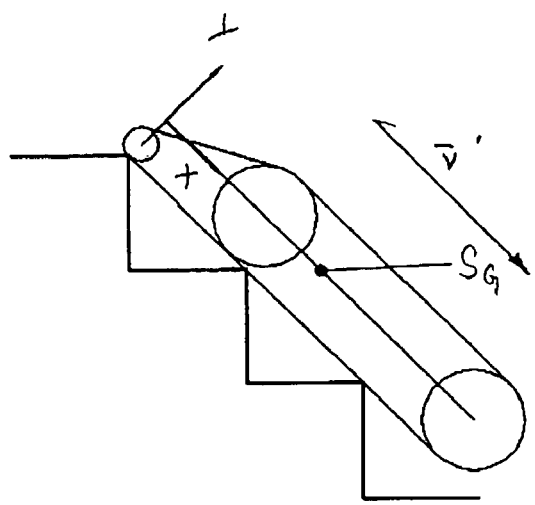
FIG. 21 is a schematic diagram of the prior art robot of FIG. 20 descending the stairs in reverse.

However, the location of COG of Won vehicle is not changeable sufficiently when it moves upstairs or downstairs as shown in FIGS. 20 and 21. Therefore, the Won vehicle cannot meet the stably moving condition when it descends stairs even when the vehicle descends stairs in reverse as shown in FIG. 21. Respectively, the COGs of Won vehicle moving on stairs are:

$$\begin{cases} \text{upstairs: } G_X = 371.71\,\text{mm} \\ \text{downstairs: } G_X = 371.71(375.35)\,\text{mm} \end{cases}$$

Figure 22:
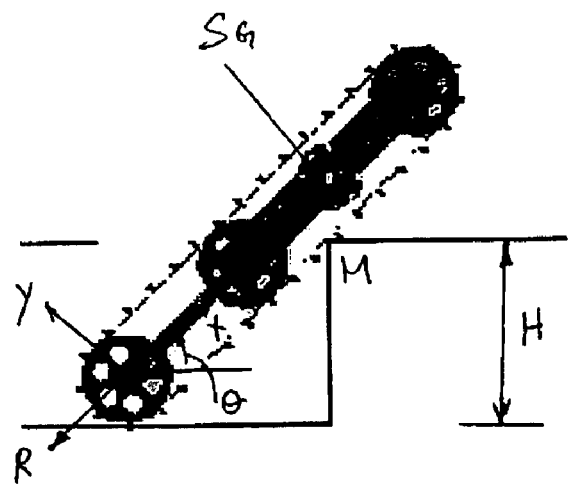
FIG. 22 is a schematic diagram of the variable configuration articulated tracked vehicle in a generally straight configuration surmounting an obstacle.

To surmount the obstacle with a height of H as shown in FIG. 22, the turning torque around M point should meet the following condition $$\Sigma M_M(mg) = M_{M\_clockwise} - M_{m\_anticlockwise} \geq 0 \quad (2)$$

Where, $M_{M\_clockwise}$—clockwise torque around M point, $M_{M\_anticlockwise}$—anticlockwise torque around M point.

Therefore, the following equation can be obtained from (2)

$$H \leq G_X \cdot \sin\alpha + R \cdot \left(1 + \dfrac{1}{\sin\alpha}\right) \quad (3)$$

Where,

α—inclining angle of the robot,

R—radius of the pulley.

Generally, the height H of an obstacle that a mobile robot is able to surmount is proportional to $G_X$. To surmount a higher obstacle, a greater $G_X$ is needed. The vehicle of the present invention can obtain a greater $G_X$ by changing the position of the arm. Since $G_{X.max}$ (486.48 mm) of the present vehicle is greater than the $G_{X.max}$ (371.71 mm) of Won vehicle, the present vehicle has a stronger capacity of surmounting obstacles.

Figure 24:
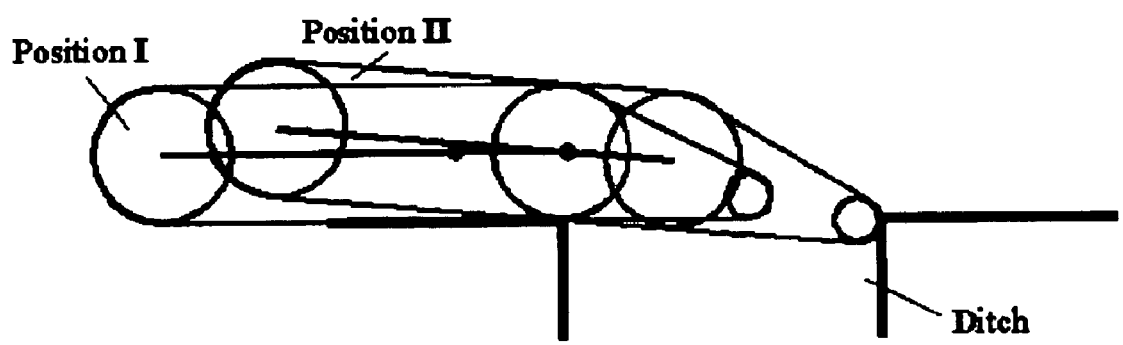
FIG. 24 is a schematic diagram of the prior art robot of FIG. 20 crossing a ditch.
Figure 23:
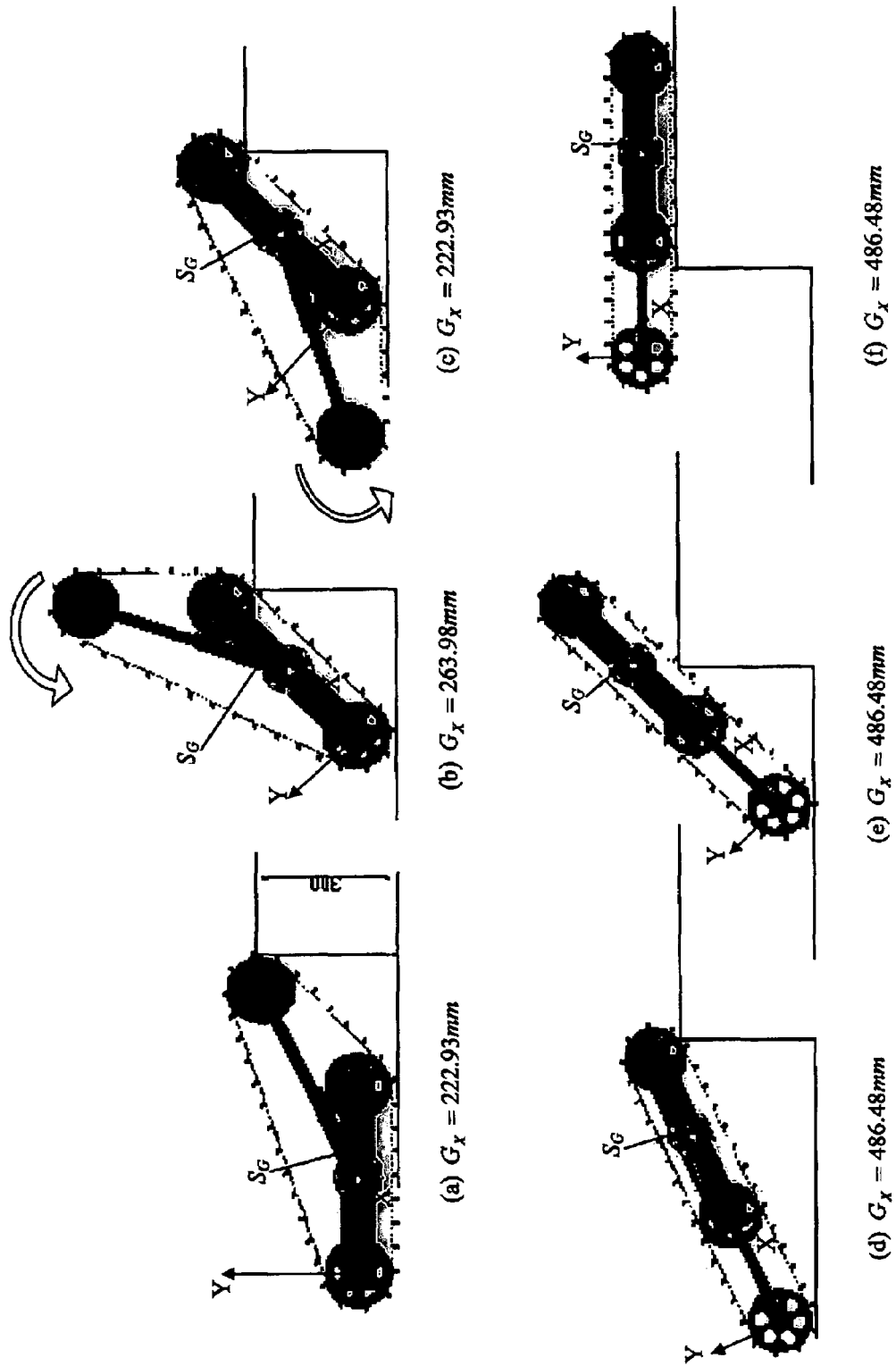
FIG. 23(a) to (f) are a set of schematic diagrams showing the variable configuration articulated tracked vehicle surmounting an obstacle.
Figure 23:
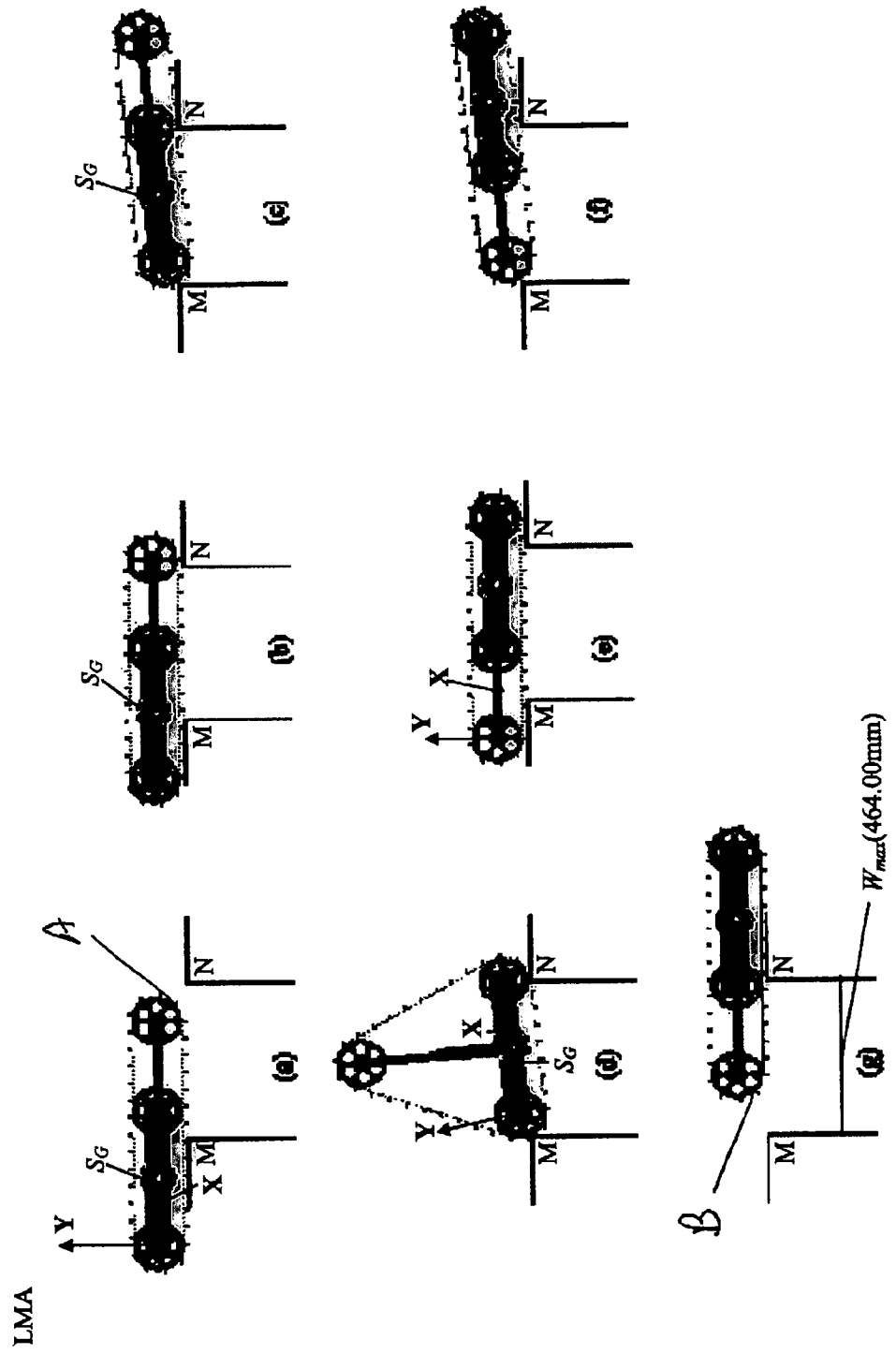

Referring to FIGS. 24 and 25, the capacity of crossing a ditch is another important property that establishes the capability of a mobile robot. By analyzing the ditch crossing process of present vehicle and the Won vehicle, we can find that the length of present vehicle (83.5 cm) is shorter than that of Won vehicle (88 cm), but the present vehicle has a stronger capacity of crossing ditch due to the application of the track configuration-controlling mechanism, e.g. the planetary wheel arm.

As shown in FIG. 25, the capacity of crossing ditch, the maximum width $W_{max}$ of a ditch that a mobile robot is able to cross can be determined according to the following criteria: (i) the outside edge point A of the planetary wheel should touch the edge point N of a ditch when the COG $S_G$ of a robot moves to a fringe point M of the ditch; and (ii) the COG $S_G$ of the mobile robot must reach or exceed the edge point N when the outside edge point B of the rear pulley touches the fringe point M of the ditch.

FIGS. 24 and 25 illustrate the processes of crossing ditch for Won vehicle and present vehicle, respectively. As shown, the present vehicle is able to cross a wider ditch even though it has a shorter length. The maximum width of a ditch that present vehicle and Won vehicle can cross are 464.00 mm and 404.72 mm, respectively.

Accordingly the vehicle of the present invention may be used for EOD (Explosive and Ordnance Disposal), EOT (Emergency Operations Team), SWAT (Special Weapons and Tactics) and SAI (Surveillance and Inspection) operations.

As used herein, the terms "comprises" and "comprising" are to be construed as being inclusive and opened rather than exclusive. Specifically, when used in this specification including the claims, the terms "comprises" and "comprising" and variations thereof mean that the specified features, steps or components are included. The terms are not to be interpreted to exclude the presence of other features, steps or components.

It will be appreciated that the above description related to the invention by way of example only. Many variations on the invention will be obvious to those skilled in the art and such obvious variations are within the scope of the invention as described herein whether or not expressly described.

What is claimed as the invention is:

1. A variable configuration articulated tracked vehicle comprising:
    a chassis;
    a pair of right drive pulleys and a pair of left drive pulleys rotatably attached to a right and left side of the chassis, respectively, each pair of right drive pulleys and left drive pulleys defining a right plane and left plane, respectively;
    a right and a left planetary wheel moveable relative to the chassis such that each of the right and left planetary wheels is in the same plane as the respective right and left planes of the pairs of right and left drive pulleys;
    a right and a left track belt, each belt extending around the pair of drive pulleys and the planetary wheel on the respective side of the chassis;
    a right and a left planetary wheel arm assembly operably connecting the respective planetary wheels to the respective sides of the chassis, each planetary wheel arm assembly including a cam attached to the chassis and defining a cam path, a cam follower movable along the cam path and having an end attached to the planetary wheel, and a crank rotatably attached to the chassis, the crank being attached to the cam follower such that the cam follower is moveable relative to the crank, whereby the planetary wheel moves along an elliptical path;
    a drive means for the right and left track belt; and
    a means for rotating the crank.

2. The variable configuration articulated tracked vehicle as claimed in claim 1 wherein the drive means includes a right drive motor and a left drive motor, each operably connected to the respective pair of right and left drive pulleys for driving the respective right and left track belts.

3. The variable configuration articulated tracked vehicle as claimed in claim 2 wherein the means for rotating the crank is a planetary motor operably connected to the right and left planetary wheels.

4. The variable configuration articulated tracked vehicle as claimed in claim 3 further including a right and left skid support for a bottom of the respective right and left track belts.

5. The variable configuration articulated tracked vehicle as claimed in claim 4 wherein each right and left skid support is compliant to impact.

6. The variable configuration articulated tracked vehicle as claimed in claim 5 wherein each pair of drive pulleys is compliant to impact.

7. The variable configuration articulated tracked vehicle as claimed in claim 1 wherein each planetary wheel arm assembly further includes a track tensioning mechanism.

8. The variable configuration articulated tracked vehicle as claimed in claim 7 wherein tensioning mechanism includes a tension follower, a guider and a spring attached therebetween whereby the spring biases the planetary wheel outwardly to tension the respective track belt.

9. The variable configuration articulated tracked vehicle as claimed in claim 8 wherein the right and left pairs of drive pulleys have diameters.

10. The variable configuration articulated tracked vehicle as claimed in claim 9 wherein the right and left planetary wheels have diameters that are the same as the diameters of the respective right and left pairs of drive pulleys.

11. The variable configuration articulated tracked vehicle as claimed in claim 10 wherein the elliptical paths of the right and left planetary wheels each have focal points at the pairs of right and left drive pulleys, respectively.

12. The variable configuration articulated tracked vehicle as claimed in claim 8 wherein the right and left planetary wheel arm assemblies are attached together with an arm main shaft such that movement of the arm main shaft moves the right and left planetary wheels in concert.

13. The variable configuration articulated tacked vehicle as claimed in claim 12 wherein the drive means is a right drive motor and a left drive motor each operably connected to the respective pair of right and left drive pulleys for driving the respective right and left track belts.

14. The variable configuration articulated tracked vehicle as claimed in claim 13 wherein the means for rotating the cranks includes a planetary motor operably connected to the right and left planetary wheels.

15. The variable configuration articulated tracked vehicle as claimed in claim 1 further including a right and left skid support for the bottom of the respective right and left track belts.

16. The variable configuration articulated tracked vehicle as claimed in claim 15 wherein each skid support is compliant to impact.

17. The variable configuration articulated tracked vehicle as claimed in claim 1 further including a robotic arm mounted on the chassis.

18. The variable configuration articulated tracked vehicle as claimed in claim 17 further including accessories attached thereto wherein the accessories are chosen from the group consisting of PTZ cameras, bio-chem sensors, x-ray equipment, disrupters; wireless equipment, standard sensors and combinations thereof.

19. The variable configuration articulated tracked vehicle as claimed in claim 1 wherein the means for rotating the crank includes a planetary motor operably attached to the right and left planetary wheel.

20. The variable configuration articulated tracked vehicle as claimed in claim 1 wherein the vehicle is operated remotely.

21. The variable configuration articulated tracked vehicle as claimed in claim 20 wherein the vehicle is invertable remotely without disturbing operation of the vehicle.

22. The variable configuration articulated tracked vehicle as claimed in claim 20 wherein the right and left planetary wheels are used to facilitate stair ascending and descending.

23. The variable configuration articulated tracked vehicle as claimed in claim 20 wherein the right and left planetary wheels are used to facilitate ditch crossing.

24. The variable configuration articulated tracked vehicle as claimed in claim 1 wherein each pair of drive pulleys is compliant to impact.

25. The variable configuration articulated tracked vehicle as claimed in claim 1 further including a remote control unit operably connected to the vehicle.

26. The variable configuration articulated tracked vehicle as claimed in claim 25 wherein the remote control unit is connected by way of radio frequency.

27. The variable configuration articulated tracked vehicle as claimed in claim 25 wherein the remote control unit includes an arm command that automatically moves a robotic arm attached to the chassis into a stowed position.

28. The variable configuration articulated tracked vehicle as claimed in claim 27 further includes another arm command that automatically moves the robotic arm into a predetermined location.

29. The variable configuration articulated tracked vehicle as claimed in claim 25 wherein the remote control unit includes a straight line chassis command that automatically moves the chassis in a straight line between a point A and a point B.

30. The variable configuration articulated tracked vehicle as claimed in claim 29 wherein the remote control unit includes circle chassis command that automatically moves the chassis in a circle of a selected radius.

31. The variable configuration articulated tracked vehicle as claimed in claim 30 further include a GPS system attached to the vehicle, wherein readings from the GPS system are used to correct the straight line chassis command and the circle chassis command.

* * * * *